(12) United States Patent
Kishi et al.

(10) Patent No.: US 7,343,084 B2
(45) Date of Patent: Mar. 11, 2008

(54) IMAGE PROCESSING APPARATUS AND METHOD, COMPUTER PROGRAM, AND COMPUTER READABLE STORAGE MEDIUM

(75) Inventors: Hiroki Kishi, Tokyo (JP); Hidefumi Osawa, Saitama (JP); Takeshi Yamazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1118 days.

(21) Appl. No.: 10/628,452

(22) Filed: Jul. 29, 2003

(65) Prior Publication Data

US 2004/0022521 A1 Feb. 5, 2004

(30) Foreign Application Priority Data

Aug. 1, 2002 (JP) ............................. 2002-224883
Jul. 1, 2003 (JP) ............................. 2003-189603

(51) Int. Cl.
*H04N 5/91* (2006.01)
*H04N 7/26* (2006.01)

(52) U.S. Cl. .......................... 386/68; 386/67; 386/109
(58) Field of Classification Search ............... 386/68, 386/67, 6, 7, 109, 111, 112
See application file for complete search history.

(56) References Cited

U.S. PATENT DOCUMENTS

| 5,377,051 A | * | 12/1994 | Lane et al. | ................... 386/81 |
| 6,285,781 B1 | | 9/2001 | Yamazaki | ................... 382/132 |
| 2003/0231865 A1 | | 12/2003 | Kishi | ......................... 386/68 |

* cited by examiner

*Primary Examiner*—Robert Chevalier
(74) *Attorney, Agent, or Firm*—Fitzpatrick, Cella, Harper & Scinto

(57) ABSTRACT

This invention can play back a smooth moving image in both normal and slow playback modes in consideration of the human visual recognition level, even when moving image data to be decoded (played back) is recorded (encoded) at a high frame rate. To this end, in this invention, respective frames, which form a moving image at 60 frames/sec, are compressed to be independently decodable. In the normal playback mode, since frames are played back using one of two frames (decimating one of two frames), a moving image is played back at 30 frames/sec which can assure sufficiently high image quality as a moving image. On the other hand, in the slow play back mode, since the number of frames to be decimated is set to be zero, and 60 frames are played back for 2 sec, a moving image is played back at the same frame rate of 30 frames/sec as that in the normal playback mode.

19 Claims, 35 Drawing Sheets

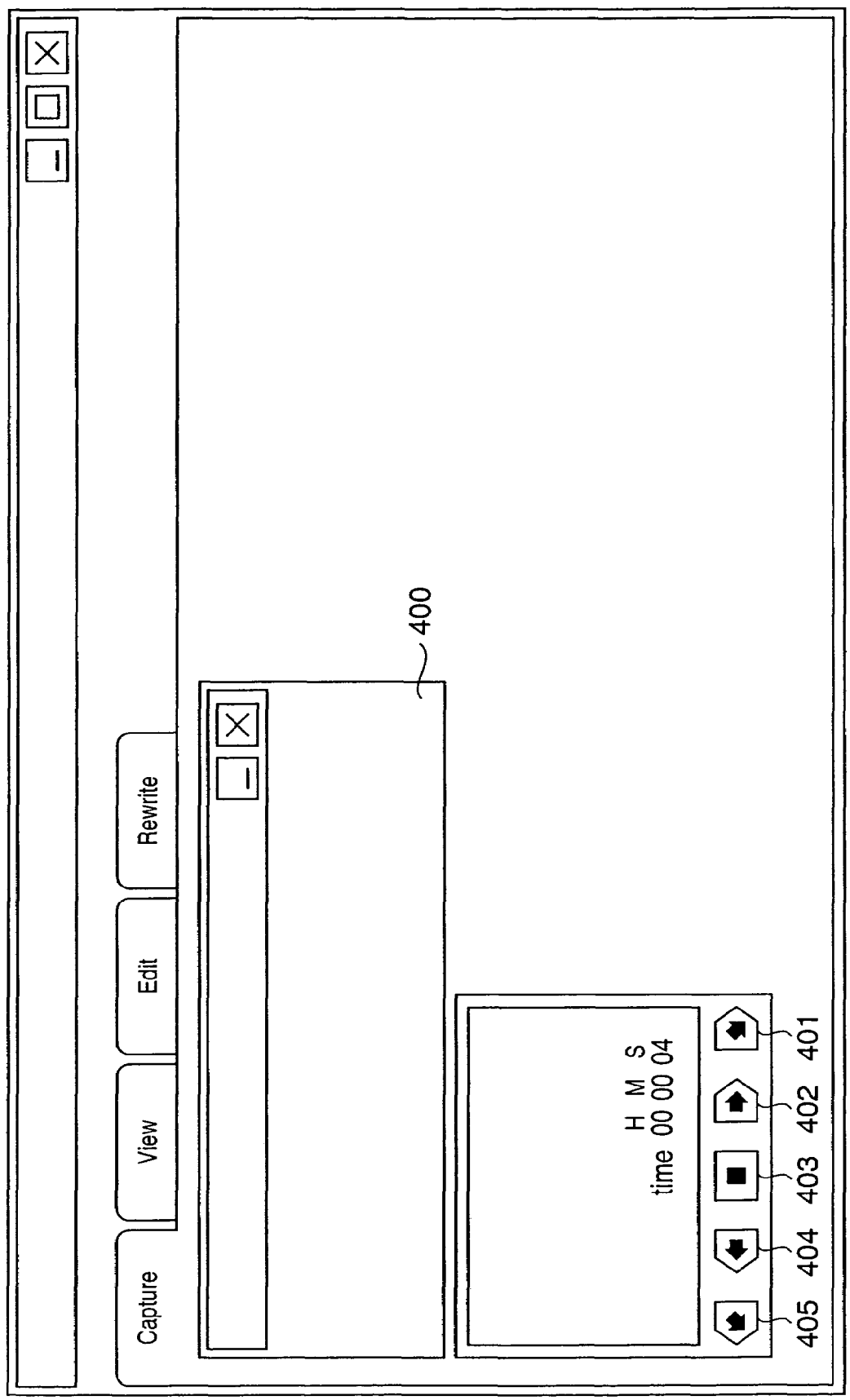

FIG. 8

| FREQUENCY COMPONENT | QUANTIZATION STEP |
|---|---|
| LL | 1 |
| HL1 | 2 |
| HH1 | 2 |
| LH1 | 2 |
| HL2 | 4 |
| HH2 | 4 |
| LH2 | 4 |
| HL3 | 8 |
| HH3 | 8 |
| LH3 | 8 |

CODE SEQUENCE USED IN SLOW PLAYBACK

IMAGE PROCESSING APPARATUS AND METHOD, COMPUTER PROGRAM, AND COMPUTER READABLE STORAGE MEDIUM

FIELD OF THE INVENTION

The present invention relates to an image processing apparatus and method, computer program, and computer readable storage medium, which decode encoded moving image data, which is obtained by independently encoding frames, in correspondence with a normal or slow playback mode.

BACKGROUND OF THE INVENTION

In recent years, technological innovation in the moving image field such as televisions and the like is remarkable, and the quality of moving images is improving.

Conventionally, a normally used display format of moving images adopts a frame rate of 30 frames/sec. In recent years, a display format having a frame rate as high as 60 frames/sec is also available.

In practice, in a normal display (e.g., playback of video-recorded data in a normal mode), 30 frames/sec can assure sufficiently high moving image quality, and many users consider that the frame rate of 60 frames/sec is not necessary. Of course, the frame rate of 60 frames/sec can assure higher image quality. However, the human eye does not accurately recognize these 60 frames, and recognizes a moving image with sufficiently high quality even at 30 frames/sec.

When a moving image is recorded at 60 frames/sec, the load on a decoder (a CPU in case of a computer) that decodes the recorded image (encoded moving image data) is heavier than decoding of encoded moving image data recorded at 30 frames/sec.

On the other hand, in a slow playback mode, a generally known moving image of 30 frames/sec is insufficient. When a moving image of 30 frames/sec is played back in a slow playback mode, an image is displayed frame by frame.

In encoding of a moving image, MPEG-2, MPEG-4, and MotionJPEG2000 as encoding schemes having hierarchy are beginning to prevail, and many moving image playback apparatuses compatible to these moving image formats are being developed accordingly.

A moving image playback apparatus which plays back such hierarchical moving image data has been developed. However, a moving image playback apparatus which can display each frame with higher image quality than a playback image in a normal playback mode while utilizing hierarchy of the moving image data in a slow playback function that allows the user to recognize details of each frame is not available at this moment.

SUMMARY OF THE INVENTION

The present invention has been made in consideration of the above prior art, and has as its object to provide an image processing apparatus and method, computer program, and computer readable storage medium, which can play back a smooth moving image in both normal and slow playback modes while taking account of the human visual recognition level even when moving image data to be decoded (played back) is recorded (encoded) at a high frame rate.

It is another object of the present invention to provide an image processing apparatus and method, computer program, and computer readable storage medium, which can improve the quality of an image to be played back in a slow playback mode.

In order to achieve the above objects, an image processing apparatus according to the present invention comprises the following arrangement.

That is, an image processing apparatus for, when a frame rate, which can assure sufficiently high image quality of a moving image, is expressed by N frames/sec, playing back moving image data, which has a frame rate of M (M>N) frames/sec higher than that frame rate, and respective frames of which are compression-encoded to be independently decodable, comprises:

decoding means for decoding the compression-encoded frames;

switching means for switching a playback mode between a normal playback mode and slow playback mode;

first playback means for, when the switching means selects the normal playback mode, reading out frames from the image data at a first frame interval, decoding the readout frames by the decoding means, and playing back the decoded frames at substantially N frames/sec; and second playback means for, when the switching means selects the slow playback mode, reading out frames from the image data at a second frame interval narrower than the first frame interval, decoding the readout frames by the decoding means, and playing back the decoded frames at least at substantially N frames/sec.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 shows an example of a display unit on the decoding/playback side (image processing apparatus);

FIG. 8 shows the relationship between subbands and quantization steps;

DETAILED DESCRIPTION OF THE PREFERRED EMBODIMENTS

Preferred embodiments according to the present invention will be described hereinafter with reference to the accompanying drawings. A basic part will be described first.

<Overview of Encoded Moving Image Data>

A process upon capturing and recording as a process for generating encoded moving image data will be briefly described below.

Figure 2:
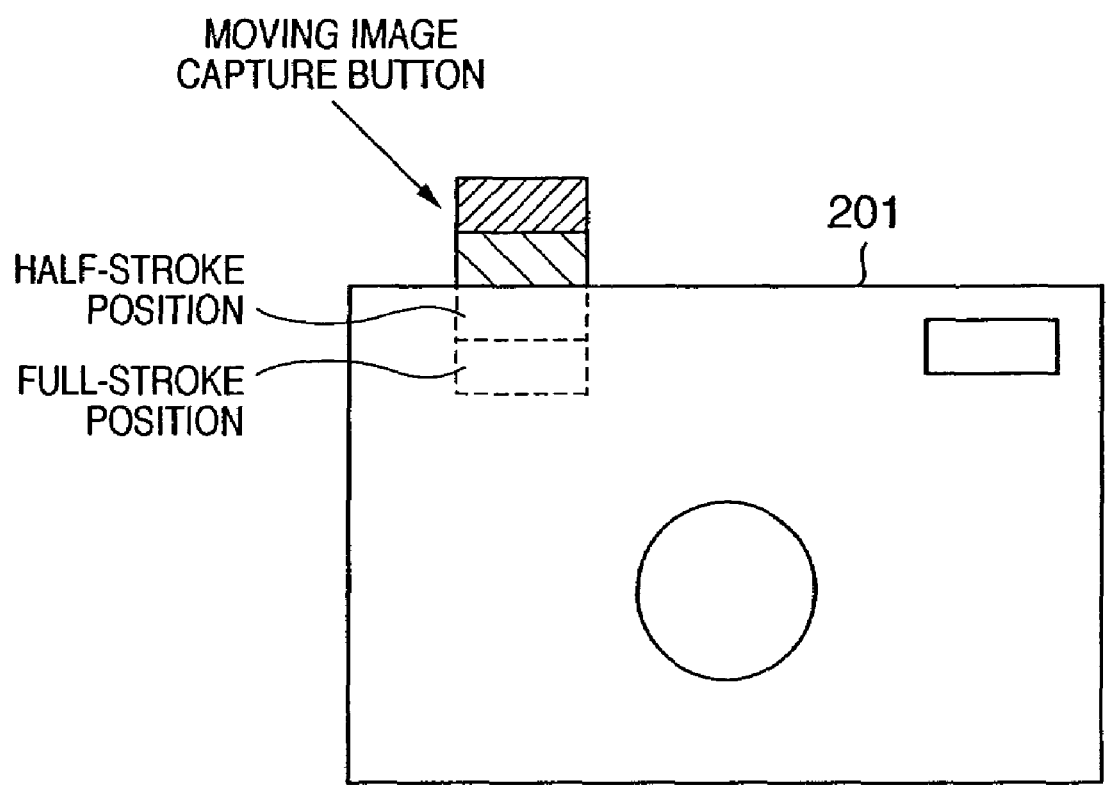
FIG. 2 is a view showing an outer appearance of a camera which is applied as a moving image generation device in the embodiment.

FIG. 2 is a schematic view of a digital camera 201 which can capture a moving image. This camera is designed to be able to capture a moving image at 30 frames/sec by depressing a moving image capture button shown in FIG. 2 to its half stroke position, and to be able to capture a moving image at 60 frames/sec by depressing that button to its full stroke position, after the latter one of a still image capture mode and moving image capture mode is selected, although a description of details of such camera will be omitted since they are known to those who are skilled in the art. For example, when the motion speed/direction of an object to be captured abruptly changes, an image of the object is normally captured at the half stroke position. Before and after that change takes place, an image of the object is captured at the full stroke position. As a result, with a series of capture operations, a moving image which includes both scenes at 30 frames/sec and at 60 frames/sec can be recorded.

Figure 3:
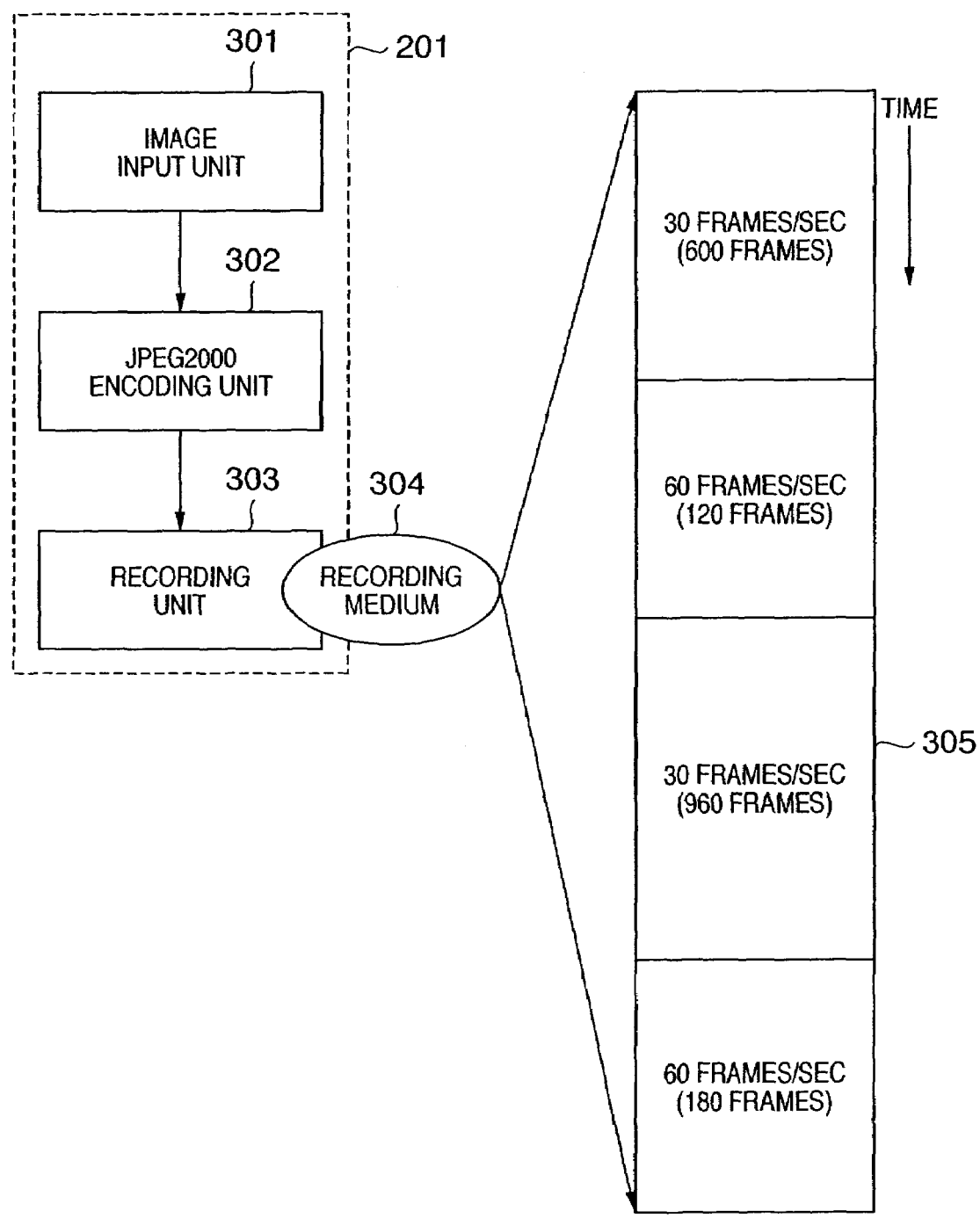
FIG. 3 is a schematic diagram of functions associated with encoding and recording in the camera.

FIG. 3 is a schematic diagram of a process for encoding and recording frame images captured by the digital camera 201. An image captured by the above method is generated for respective frames from an image input unit 301. Respective frames (images) are independently encoded by a JPEG2000 encoding unit 302 frame by frame. Note that the encoding method of the JPEG2000 encoding unit will be described later. In the present invention, it is important that respective frames are independently encoded, in other words, respective frames can be independently decoded, and the encoding method is not particularly limited as long as this condition is met. Hence, a JPEG encoder may be used in place of the JPEG2000 encoding unit 302.

The encoded data of the encoded frames are time-serially recorded on a recording medium 304 by a recording unit 303. At this time, the recording unit identifies whether or not each frame is obtained by capturing at 30 frames/sec or 60 frames/sec, by monitoring a control signal from the image input unit, a control signal from the capture button in FIG. 2, or the like, and records information indicating the identification result on the recording medium together with the encoded data of that frame. In this way, the decoding side can detect the start frames of scenes captured at 30 and 60 frames/sec. Note that the identification information may be inserted in the header field of encoded data of each frame. In such case, it is preferable to use a free space in the header where data can be freely written, so as to maintain compatibility of encoded data.

In the recording medium 304, respective encoded data are successively recorded like a stream 305 in FIG. 3.

<Outline of JPEG2000 Encoding Method>

Figure 17:
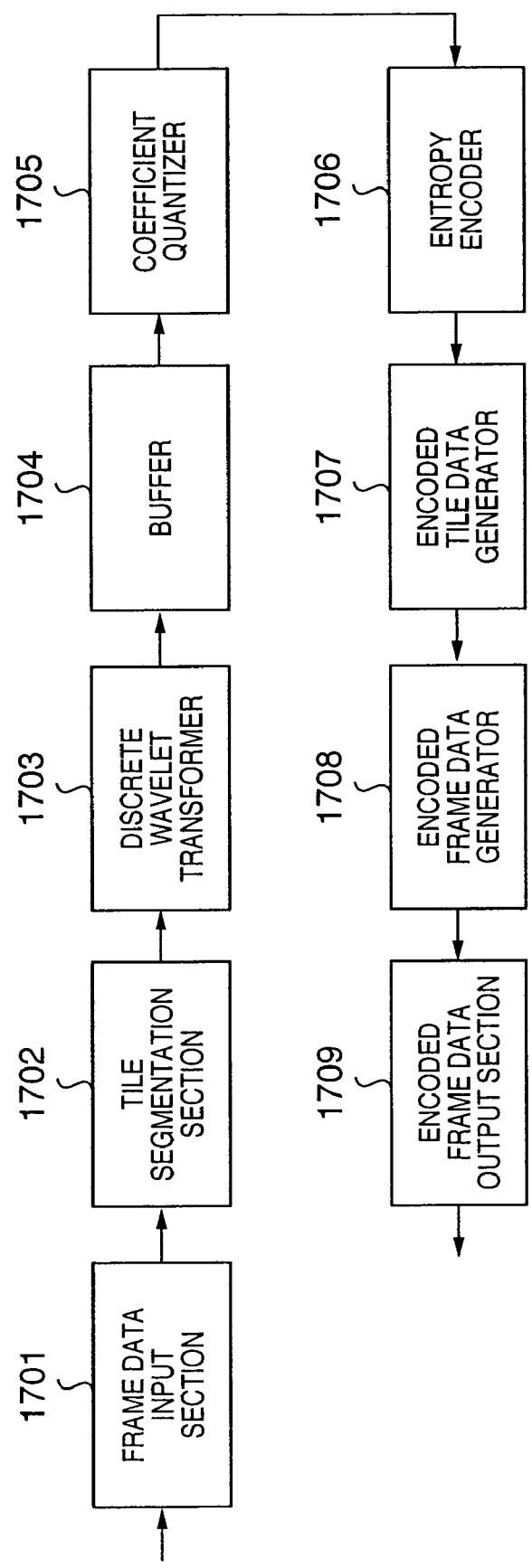
FIG. 17 is a schematic block diagram showing the arrangement of a JPEG2000 encoding unit in the first embodiment.
Figure 18:
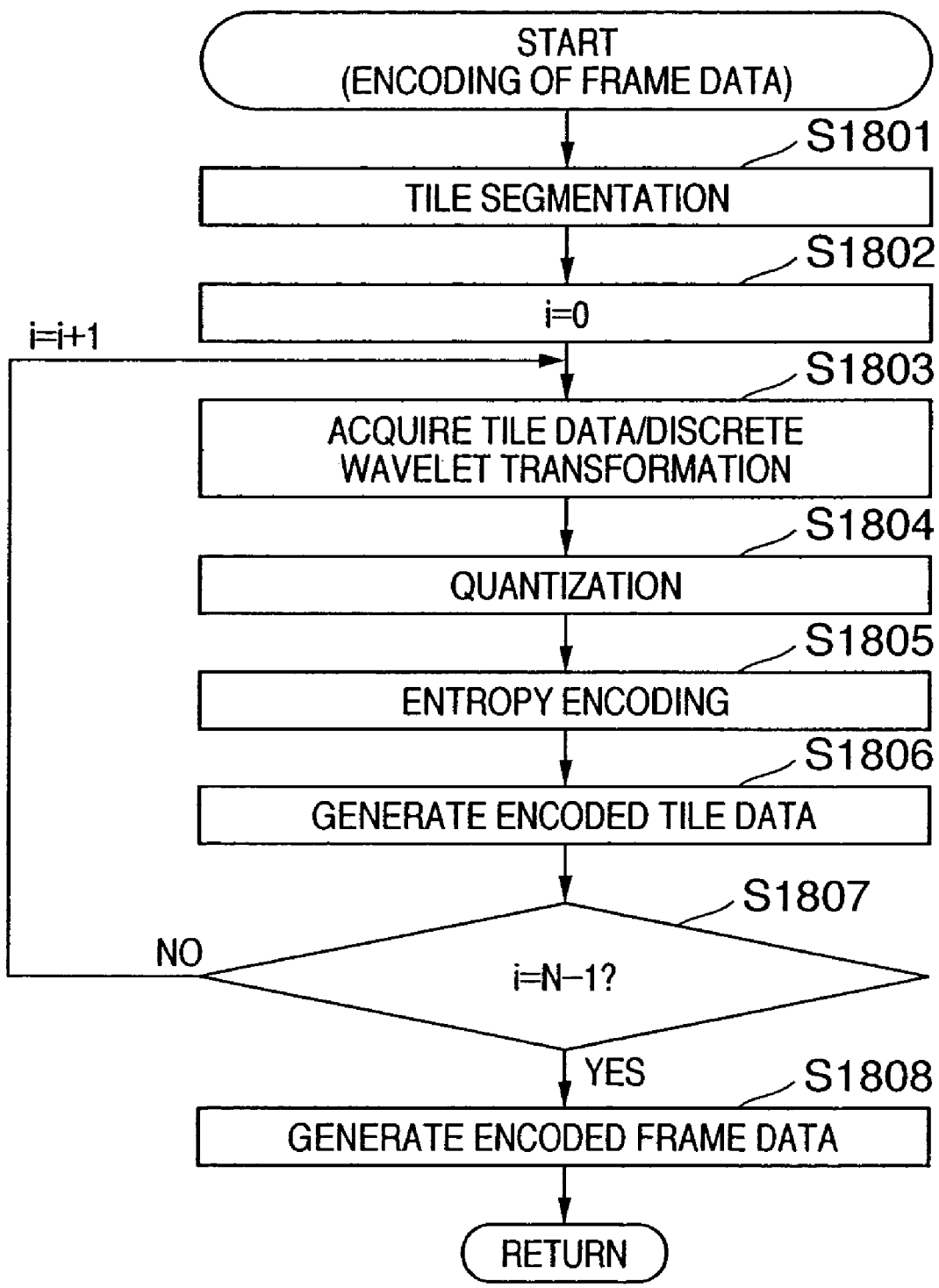
FIG. 18 is a flow chart of a frame data encoding process executed by a JPEG2000 encoding unit 203 in the first embodiment.

FIG. 17 is a block diagram of the JPEG2000 encoding unit 302, and FIG. 18 is a flow chart showing the process of the encoding unit 302. The frame data encoding process will be described below using FIGS. 17 and 18. Please refer to the ISO/IEC recommendation for details such as a header creation method and the like.

In this embodiment, assume that frame data to be encoded is 8-bit monochrome frame data for the sake of simplicity. Also, the present invention can be applied to a monochrome image which is expressed by the number of bits other than 8 bits (e.g., 4 bits, 10 bits, or 12 bits per pixel), or multi-valued color frame data which expresses each color component (RGB/Lab/YCrCb) of each pixel by 8 bits (of course, the number of bits is not limited to 8). Furthermore, the present invention can be applied to multi-valued information which represents the states and the like of each pixel that forms an image, or a multi-valued index value which represents the color of each pixel. In these applications, each kind of multi-valued information can be considered as monochrome frame data.

Frame data of a captured image are input to a frame data input section 1701, and are then output to a tile segmentation section 1702 in a raster scan order.

Figure 16:
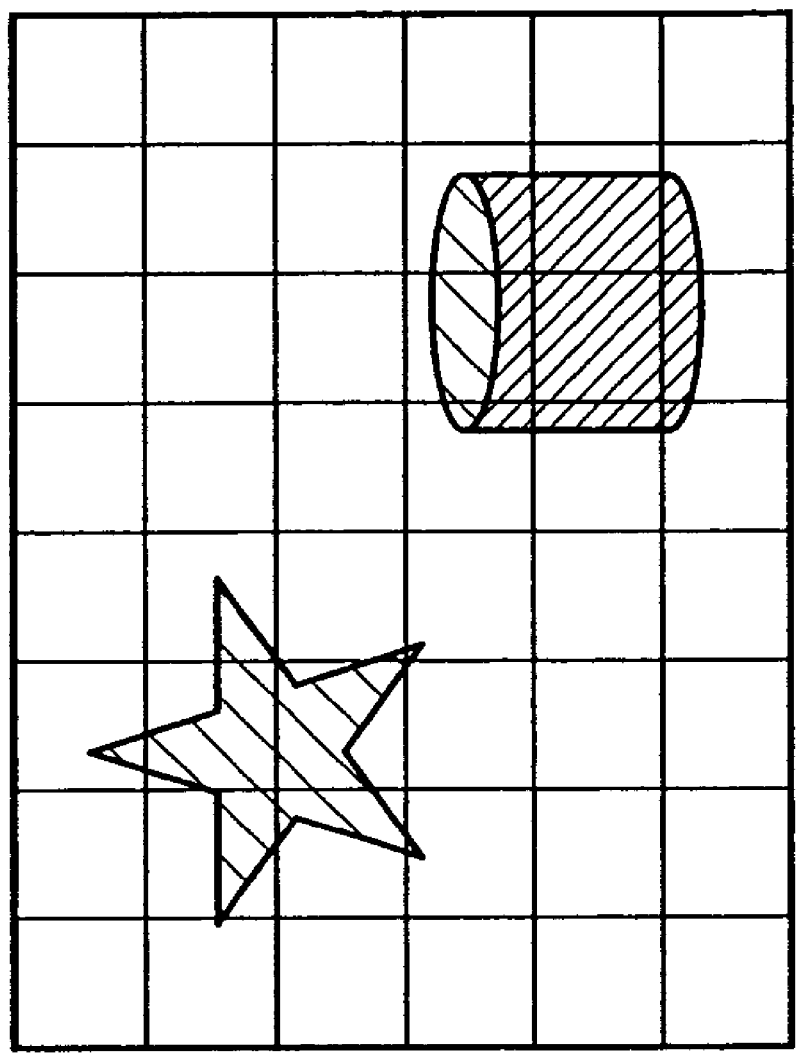
FIG. 16 shows an example of tile segmentation.

The tile segmentation section 1702 segments one image (one frame) input from the frame data input section 1701 into N tiles, as shown in FIG. 8 (step S1801), and assigns tile numbers i=0, 1, 2, . . . , N−1 in a raster scan order in the first embodiment so as to identify respective tiles. In this embodiment, assume that an image is broken up into 48 tiles (=8 (horizontal)×6 (vertical)), as shown in FIG. 16.

Note that data indicating each tile will be referred to as tile data hereinafter. These generated tile data are sent in turn to a discrete wavelet transformer 1703. In the processes of the discrete wavelet transformer 1703 and subsequent sections, each tile is encoded independently. Also, a counter (not shown) used to recognize a tile to be processed by the JPEG2000 encoding unit 302 is set to i=0 (step S1802).

The discrete wavelet transformer 1703 computes the discrete wavelet transforms using data (reference pixel data) of a plurality of pixels (reference pixels) in one tile data x(n) in one still image, which is input from the tile segmentation section 1702 (step S1803).

Figure 6:
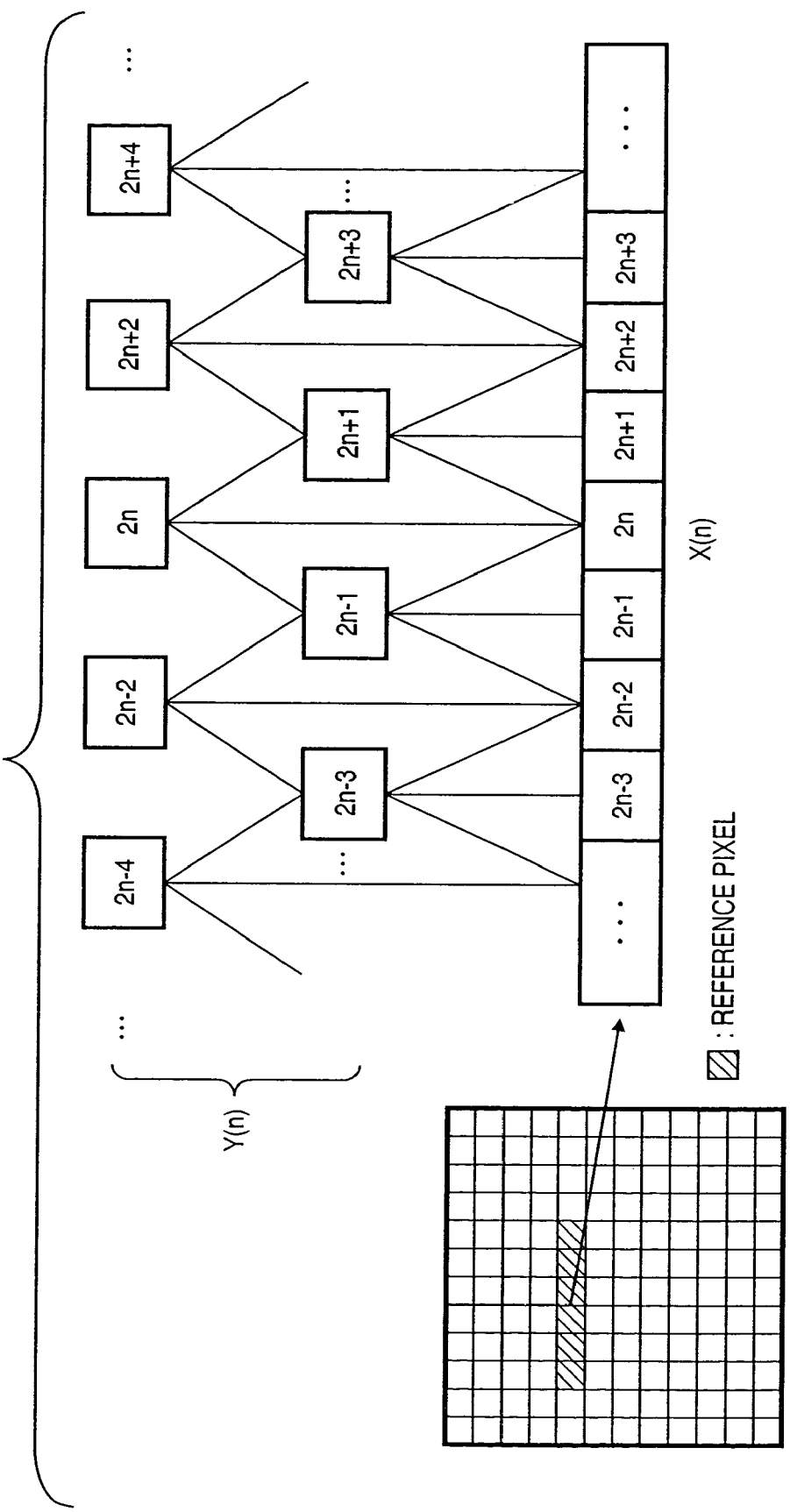
FIG. 6 is a view for explaining an outline of a linear discrete wavelet transformation process.

Frame data after discrete wavelet transformation (discrete wavelet transform coefficients) is given by:

$$Y(2n)=X(2n)+\text{floor}\{(Y(2n-1)+Y(2n+1)+2)/4\}$$

$$Y(2n+1)=X(2n+1)-\text{floor}\{(X(2n)+X(2n+2))/2\}$$

where $Y(2n)$ and $Y(2n+1)$ are discrete wavelet transform coefficient sequences ($Y(2n)$ indicates low-frequency subband data, and $Y(2n+1)$ indicates high-frequency subband data). Also, floor$\{X\}$ in the above formulas indicates a function which returns a maximum integer that does not exceed X. FIG. 6 illustrates this discrete wavelet transformation process.

Figure 7:
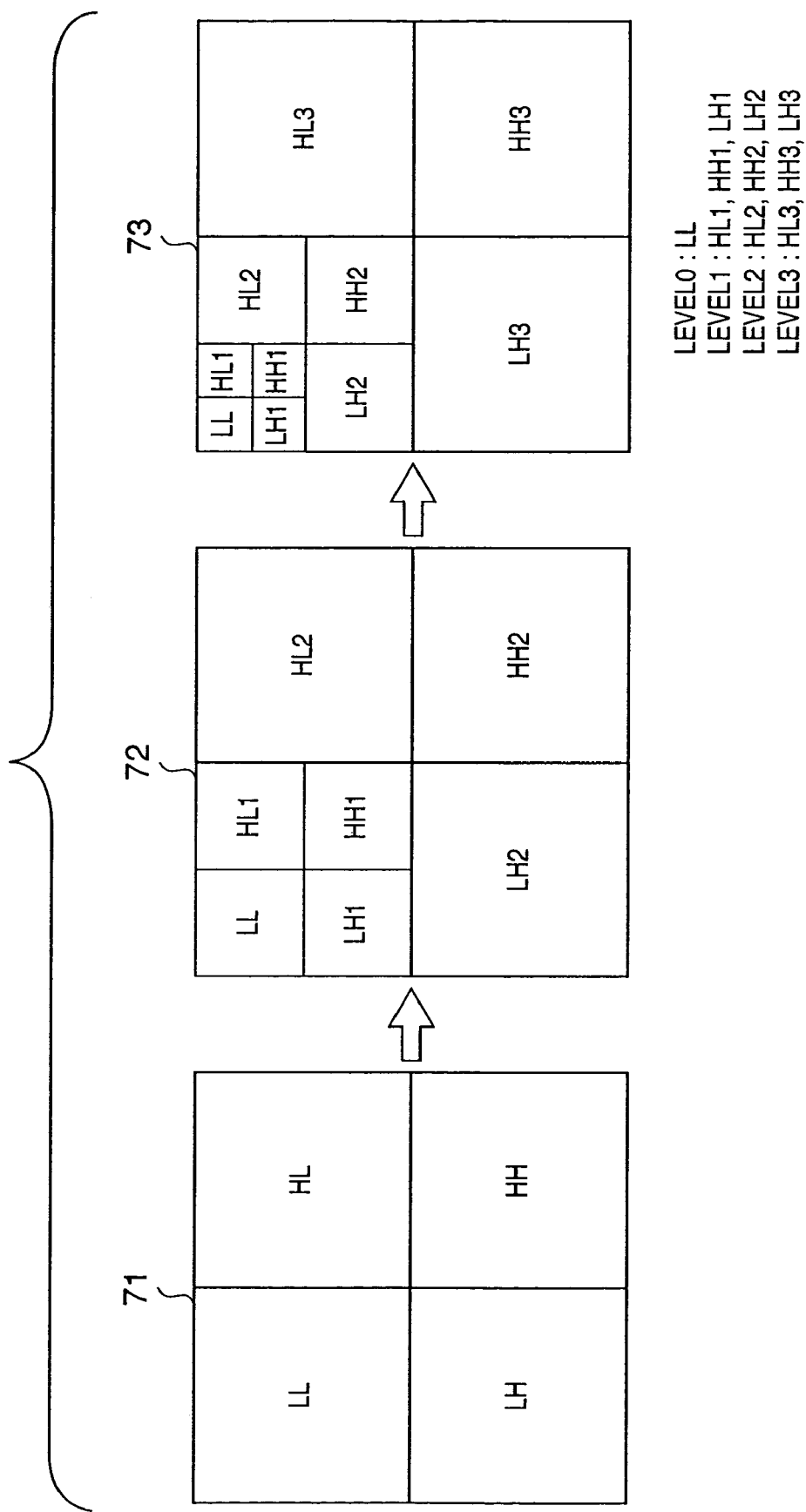
FIG. 7 shows subband distributions formed by first to third stages of wavelet transformation.

These transformation formulas correspond to one-dimensional data. When two-dimensional transformation is attained by applying this transformation in turn in the horizontal and vertical directions, data can be broken up into four different frequency components (subbands) LL, HL, LH, and HH, as denoted by reference numeral 71 in FIG. 7. Note that L indicates a low-frequency subband, and H indicates a high-frequency subband. Then, the LL subband is similarly broken up into four subbands (reference numeral 72 in FIG. 7), and an LL subband of these subbands is further broken up into four subbands (reference numeral 73 in FIG. 7). In this way, a total of 10 subbands are generated. The 10 subbands are respectively named HH1, HL1, ..., as denoted by reference numeral 73 in FIG. 7. A suffix in each subband name indicates the level of a subband. That is, the subbands of level 1 are HL1, HH1, and LH1, and those of level 2 are HL2, HH2, and LH2. Note that the LL subband is a subband of level 0. Since there is only one LL subband, no suffix is appended. A decoded image obtained by decoding subbands from level 0 to level n will be referred to as a decoded image of level n hereinafter. The decoded image has higher resolution with increasing level.

The transform coefficients of the 10 subbands are temporarily stored in a buffer 1704, and are output to a coefficient quantizer 1705 in the order of LL, HL1, LH1, HH1, HL2, LH2, HH2, HL3, LH3, and HH3, i.e., in turn from a subband of lower level to that of higher level.

The coefficient quantizer 1705 quantizes the transform coefficients of the subbands output from the buffer 1704 by quantization steps which are determined for respective frequency components, and outputs quantized values (coefficient quantized values) to an entropy encoder 1706 (step S1804). Let X be a coefficient value, and q be a quantization step value corresponding to a frequency component to which this coefficient belongs. Then, quantized coefficient value $Q(X)$ is given by:

$$Q(X)=\text{floor}\{(X/q)+0.5\}$$

FIG. 8 shows the correspondence between frequency components and quantization steps in this embodiment. As shown in FIG. 8, a larger quantization step is given to a subband of higher level. Note that the quantization steps for respective subbands are stored in advance in a memory such as a RAM, ROM, or the like (not shown). After all transform coefficients in one subband are quantized, these coefficient quantized values are output to the entropy encoder 1706.

Figure 9:
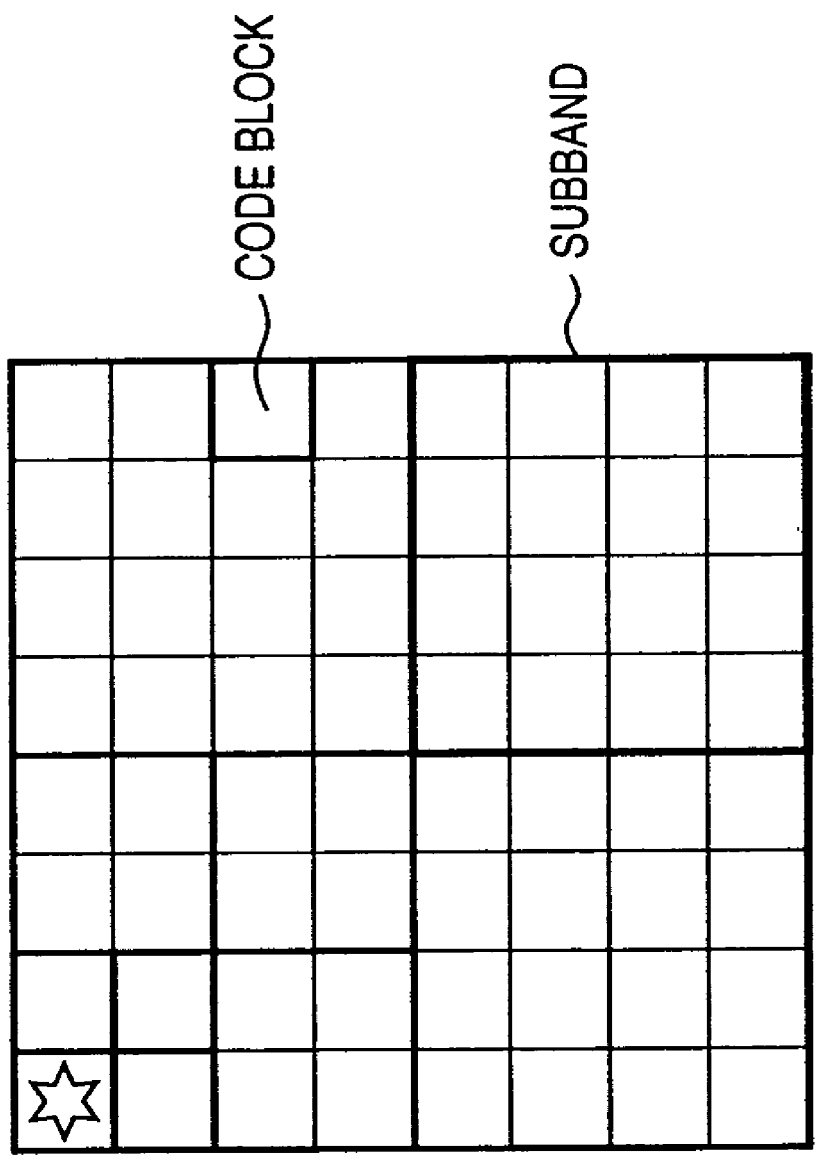
FIG. 9 is a view for explaining code block segmentation.
Figure 10:
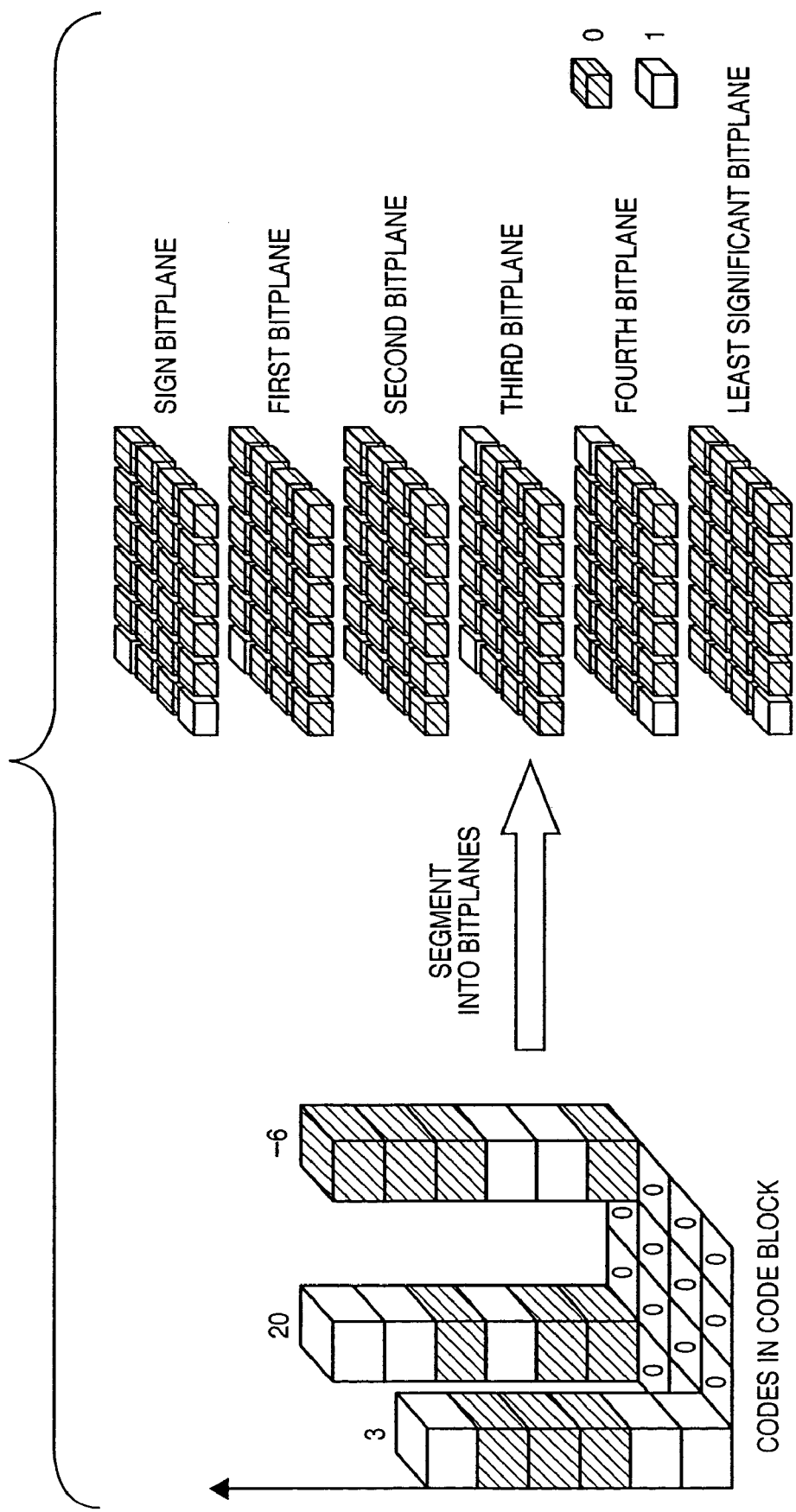
FIG. 10 is a view showing an example of bitplane segmentation.
Figure 11:
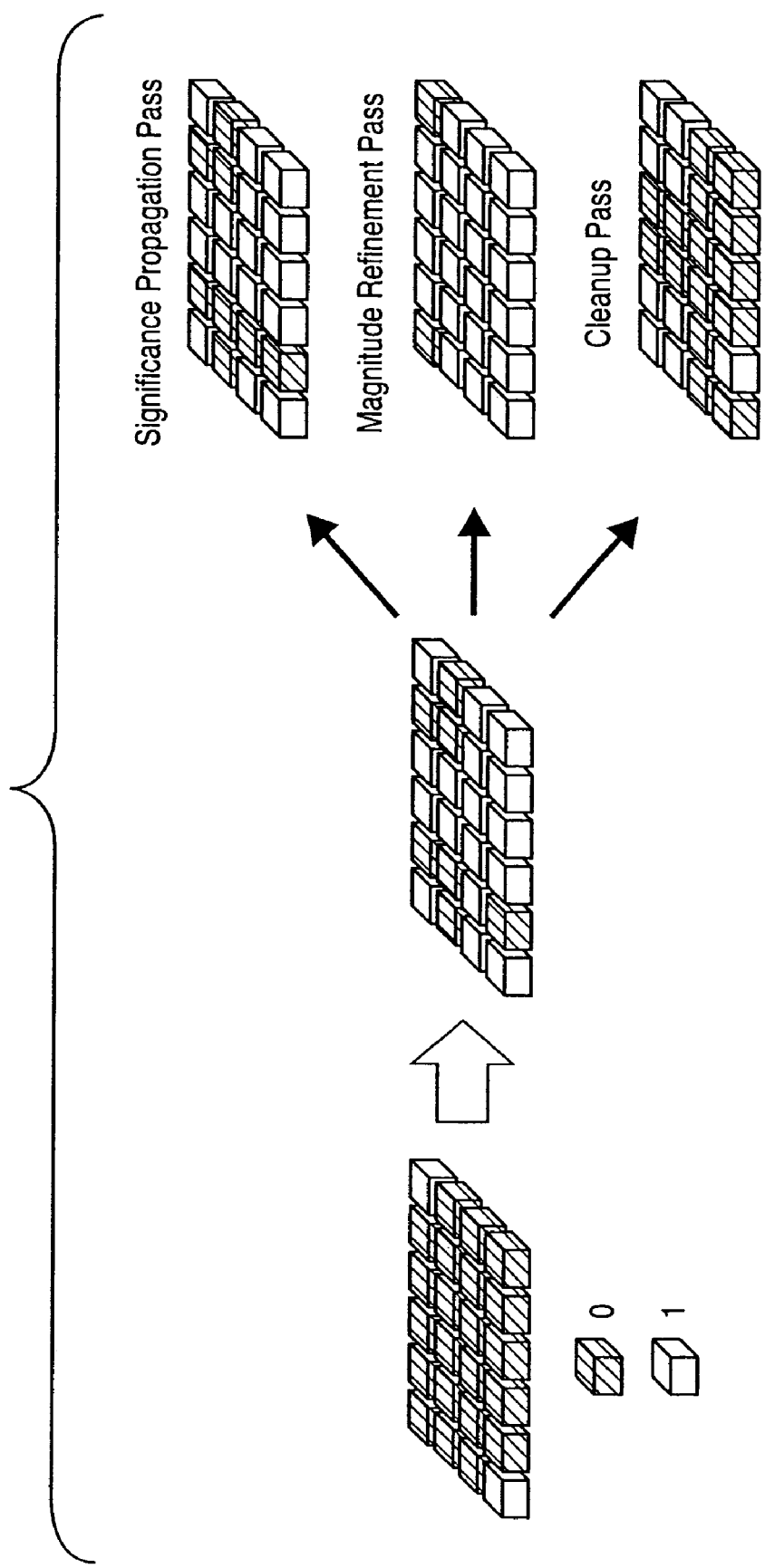
FIG. 11 shows coding passes.

The entropy encoder 1706 entropy-encodes the input coefficient quantized values (step S1805). In this process, each subband as a set of the input coefficient quantized values is segmented into blocks (to be referred to as code blocks hereinafter), as shown in FIG. 9. Note that the code block is set to have a size of 2m×2n (m and n are integers equal to or larger than 2) or the like. The code block is further broken up into a bitplane of the positive and negative signs, first bitplane, second bitplane, ..., as shown in FIG. 10. Bits on the respective bitplanes are then categorized into three groups on the basis of predetermined categorizing rules to generate three different coding passes as sets of bits of identical types, as shown in FIG. 11. The input coefficient quantized values undergo binary arithmetic encoding as entropy encoding using the obtained coding passes as units, thereby generating entropy encoded values.

Note that entropy encoding of one code block is done in the order from upper to lower bitplanes, and a given bitplane of that code block is encoded in turn from the upper one of the three different passes shown in FIG. 11.

The entropy-encoded coding passes are output to an encoded tile data generator 1707.

The encoded tile data generator 1707 forms one or a plurality of layers based on the plurality of input coding passes, and generates encoded tile data using these layers as a data unit (step S1806). An explanation that pertains to the configuration of layers will be given below.

Figure 12:
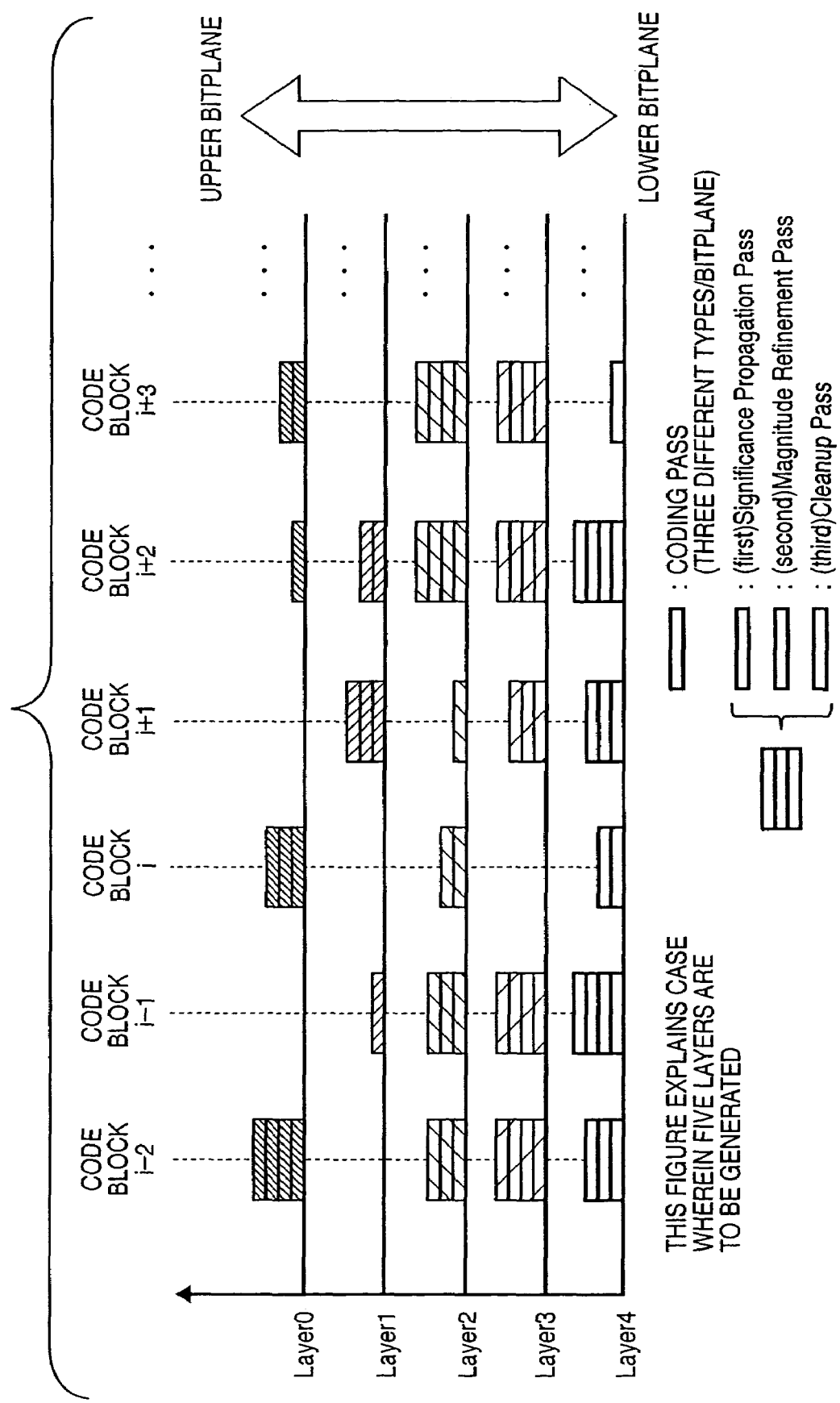
FIG. 12 is a view for explaining an outline of layer generation.
Figure 13:
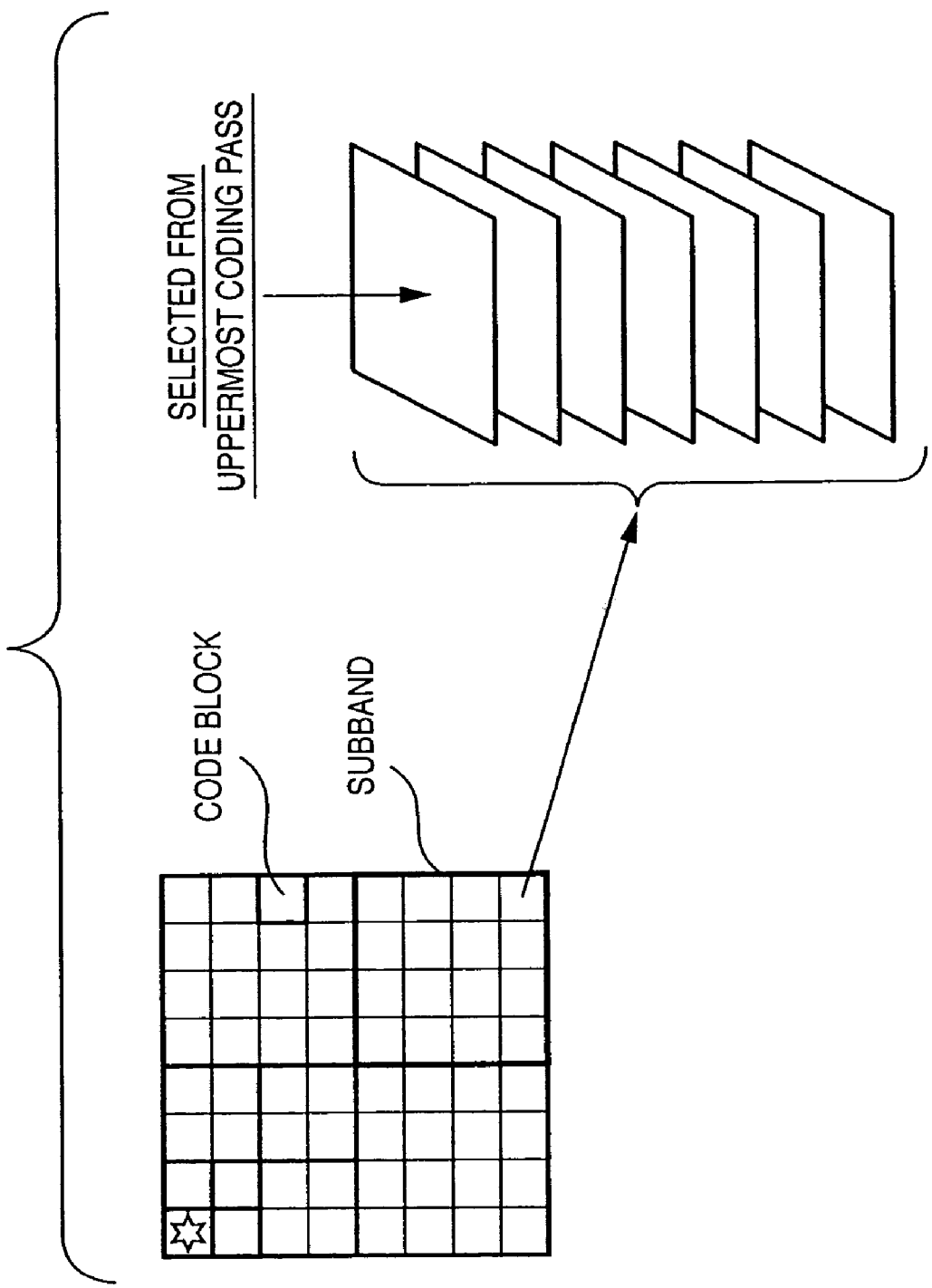
FIG. 13 is a view for explaining layer generation.
Figure 14:
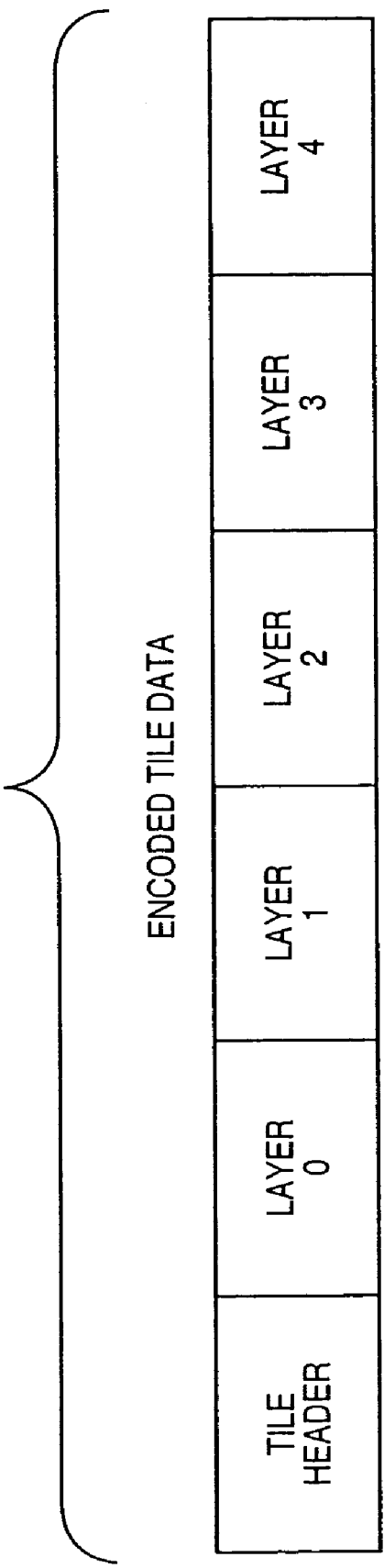
FIG. 14 shows the format of encoded tile data.

The encoded tile data generator 1707 forms layers after it collects the entropy-encoded coding passes from the plurality of code blocks in the plurality of subbands, as shown in FIG. 12. Upon acquiring coding passes from an arbitrary code block, coding passes are always selected in turn from the uppermost one in that code, as shown in FIG. 13. After that, the encoded tile data generator 1707 arranges the generated layers in turn from an upper one, as shown in FIG. 14, and appends a tile header to the head of these layers, thus generating encoded tile data. This header stores information used to identify a tile, the code length of the encoded tile data, various parameters used in compression, and the like. The encoded tile data generated in this way is output to an encoded frame data generator 1708.

If tile data to be encoded still remain, the flow returns to step S1803; otherwise, the flow advances to step S1808 (step S1807).

Figure 15:
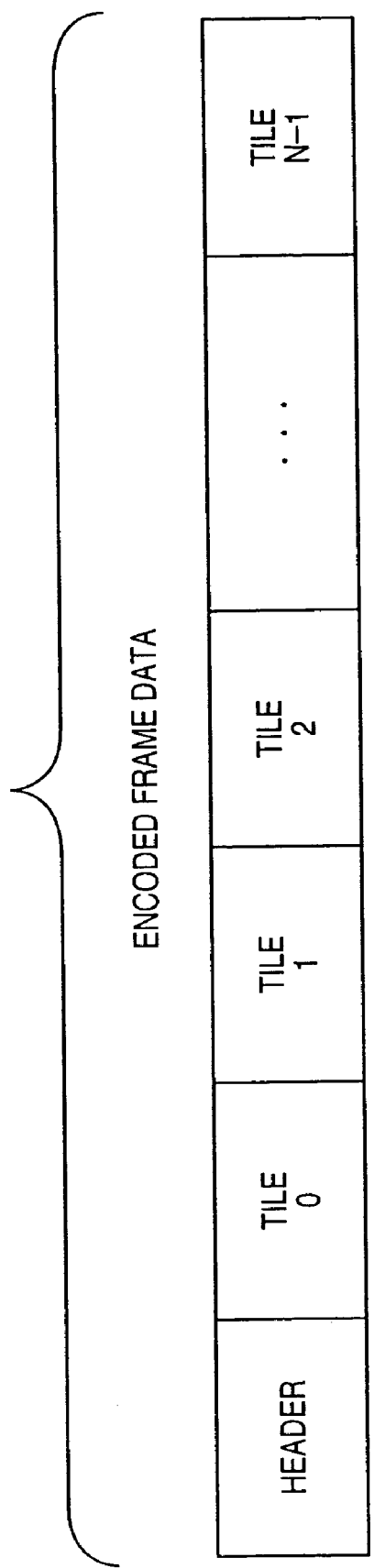
FIG. 15 shows the format of encoded frame data.

The encoded frame data generator 1708 arranges the encoded tile data in a predetermined order, as shown in FIG. 15, and appends a header to the head of these encoded tile data, thus generating encoded frame data (step S1808). This header stores the vertical×horizontal sizes of the input image and each tile, various parameters used in compression, the code length of the encoded frame data, and the like. The encoded frame data generated in this way is output from an encoded frame data output section 1709 to the recording unit (step S1809).

The frame data encoding method based on JPEG2000 has been explained.

<Decoding/Playback>

How to decode the encoded moving image data generated as described above will be explained below.

Figure 1:
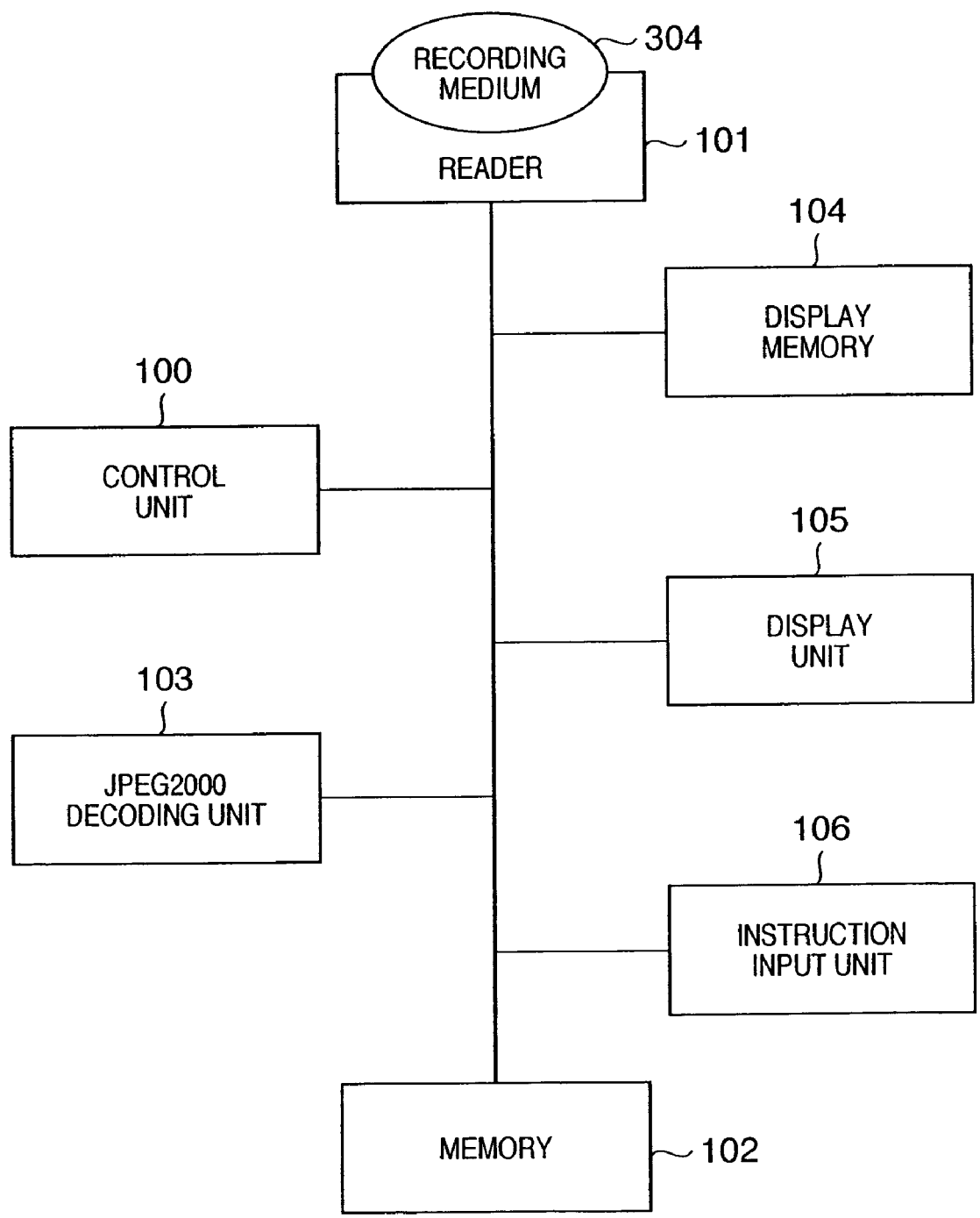
FIG. 1 is a block diagram of an image processing apparatus according to an embodiment of the present invention.

FIG. 1 is a schematic block diagram of a decoding apparatus (e.g., a personal computer or the like) used in this embodiment. In FIG. 1, reference numeral 100 denotes a control unit (microprocessor) for controlling the operations of respective units. This control unit receives instructions (e.g., a switching instruction between a normal playback mode and slow playback mode, playback start instruction, playback stop instruction, and the like) from a user interface (to be described later), and controls the operations of respective units in correspondence with these instructions.

Reference numeral 101 denotes a reader which reads out encoded moving image data recorded on the recording medium 304 shown in FIG. 3. Reference numeral 102 denotes a memory for temporarily storing the encoded moving image data read out by the reader 101. Also, the memory temporarily stores a decoded image obtained by decoding this encoded moving image data. Furthermore, the memory can store program data and the like used by respective units in the apparatus, and is used as various work memories.

Reference numeral 103 denotes a JPEG2000 decoding unit which corresponds to the decoding side of the aforementioned JPEG2000 encoding unit 302. The decoding unit 103 sequentially decodes encoded data of respective frames, which are encoded by JPEG2000 and are recorded on the recording medium 304. The JPEG2000 decoding method will be described later.

Reference numeral 104 denotes a display memory for storing the next image for one frame to be displayed. In this embodiment, the decoded image temporarily stored in the memory 102 is read out sequentially (or an identical frame is often read out repetitively) under the timing control of the control unit, and is written in this memory 104. Assume that the memory 104 has a capacity for a plurality of frames, so that read and write accesses do not overlap, and the control unit 100 also manages such read and write accesses.

Reference numeral 105 denotes a display unit, which corresponds to a display normally equipped in a personal computer or the like. The display unit 105 displays frames (images) held in the memory 105 at a display frame rate (60 frames/sec in this embodiment) given to the display unit. Especially, in this embodiment, display frame rate B of this display unit is higher than a popular frame rate of 30 frames/sec. Also, assume that rate B used upon reading out an image from the display memory 104 and outputting it to the display unit 105 is fixed. In other words, a characteristic feature of this embodiment lies in a write process in this display memory 104.

Reference numeral 106 denotes an instruction input unit, which comprises, e.g., a mouse and keyboard. Alternatively, the instruction input unit 106 may comprise a touch panel integrated with the display unit 105. The user can input every instructions associated with playback via this instruction input unit with reference to an operation window displayed on the display unit.

FIG. 4 shows an operation window displayed on the display unit when a playback application of this embodiment runs. Reference numeral 400 denotes a display area for actually displaying an image (moving image) stored in the display memory. An image is displayed not on the entire screen of the display unit but on this area 400.

Reference numerals 401 and 402 denote buttons used to instruct playback in a normal time axis direction. That is, the button 401 is used to instruct a normal speed playback mode, and the button 402 is used to instruct a slow playback mode (playback at a somesthetic speed of ½ the normal speed in this embodiment). Reference numeral 403 denotes a stop button. Note that a pause button may be added.

Reference numerals 404 and 405 denote buttons used to instruct playback in a direction opposite to the normal time axis direction. The button 405 is used to instruct a reverse playback mode at a normal speed, and the button 404 is used to instruct a slow reverse playback mode (playback at a somesthetic speed of ½ the normal speed in this embodiment). In this embodiment, since each of frames which form a moving image is independently encoded, reverse playback can be easily attained by decoding and displaying these frames in a reverse order.

The flow of operations required until encoded moving image data is actually decoded and displayed will be described in detail below using FIGS. 5A and 5B. Note that only the operation control of playback will be explained. The reverse playback modes (corresponding to uses of buttons 404 and 405) can be easily understood by those who are skilled in the art by reversing the time axis in the two different playback modes (normal and slow playback modes) to be described below, and replacing the buttons 401 and 405, and 402 and 404 with each other. Hence, a description of such modes will be omitted.

In the following description, assume that encoded moving image data includes both frames captured at 60 frames/sec and those captured at 30 frames/sec, as indicated by the stream 305 in FIG. 3.

Figure 5A:
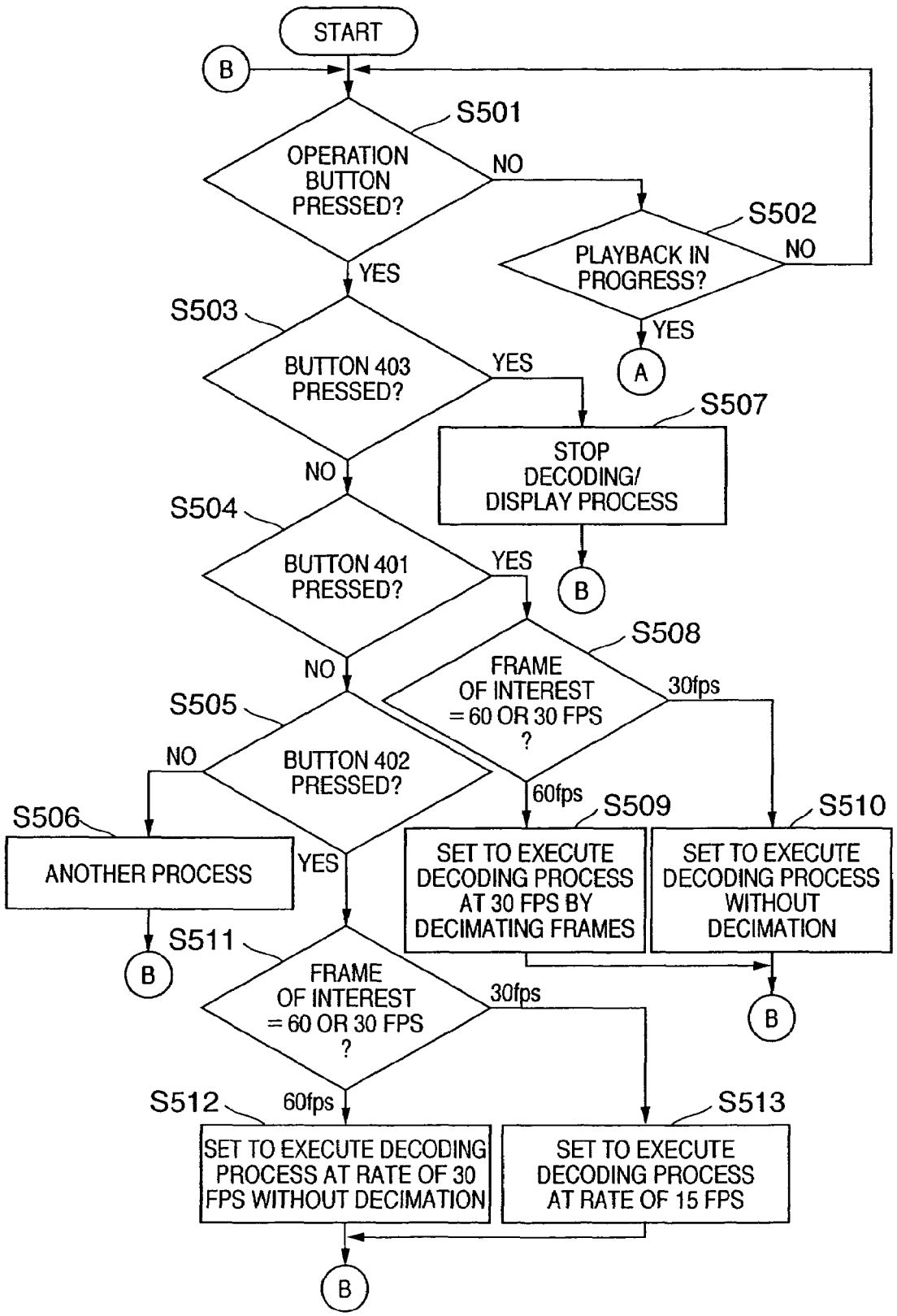
FIGS. 5A and 5B are flow charts showing a control sequence of the apparatus on the basis of an instruction of a display unit 105 (instruction input unit 106)
Figure 5B:
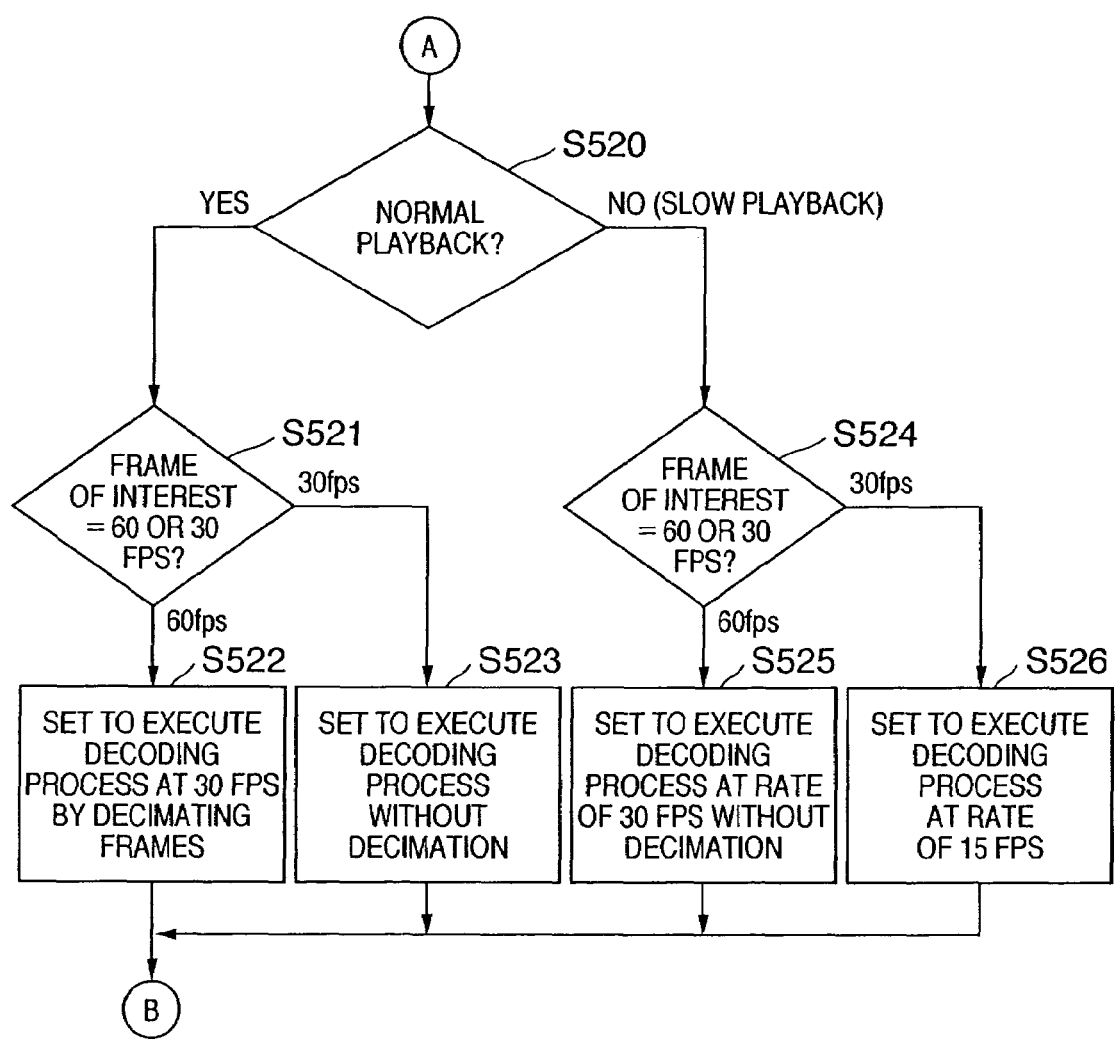

Referring to FIG. 5A, it is checked in step S501 if the user has pressed one of the playback and stop buttons 401 to 403. Note that the "pressing" operation means an operation for designating (clicking) a displayed button using the instruction input unit 106 (mouse or the like) in FIG. 1, but its implementation means is not particularly limited.

If it is determined that the user has pressed none of the buttons 401 to 403, it is checked in step S502 if playback is in progress now. If NO in step S502, the processes in steps S501 and S502 are repeated.

If the user has pressed one of the buttons 401 to 403, the pressed button is then specified in subsequent steps. Note that the order of these checking steps is not particularly limited. In the description of FIG. 5A, it is checked in step S503 if the user has pressed the button 403 (stop button). If NO in step S503, it is checked in step S504 if the user has pressed the button 401 (normal playback mode). If NO in step S504, it is checked in step S505 if the user has pressed the button 402 (slow playback mode).

If it is determined that the user has pressed a button other than the buttons 401 to 403, the flow advances to step S506 to execute a corresponding process. If it is determined that the user has pressed the button 403, the flow advances to step S507 to stop all decoding and playback operations.

If it is determined that the user has pressed the button 401, this means that the normal playback mode is designated. In this case, the flow advances to step S508, and the header of the current frame of interest for playback is checked to see if that frame is captured in either a 60- or 30-fps mode. If it is determined that the frame is captured at 60 fps, the flow advances to step S509 to set the JPEG2000 decoding unit 103 to execute a decoding process at a rate of 30 fps while ignoring one of two frames, i.e., decimating two successive frames to one frame (details will be described later). If it is determined that the frame of interest for playback is captured at 30 fps, the flow advances to step S510 to set the decoding unit 103 to execute a decoding process at 30 fps without decimating input frames.

On the other hand, if it is determined that the user has pressed the button 402, i.e., if it is determined that the slow playback mode is designated, the flow advances to step S511. In this case as well, the header of encoded data the frame of interest for playback is checked to see if that frame is captured in either a 60- or 30-fps mode.

If it is determined that the frame is captured at 60 fps, the flow advances to step S512 to set the decoding unit to decode at a rate of 30 fps without decimation (details will be described later). If it is determined that the frame is captured at 30 fps, the flow advances to step S513 to set the decoding unit to execute a decoding process of respective frames at a rate of 15 fps.

If it is determined in step S502 that playback is in progress, the flow advances to step S520 (FIG. 5B) to check if the playback mode is a normal speed mode.

If it is determined that the playback mode is a normal speed mode, the flow advances to step S521 to determine whether the frame of interest is captured at 60 or 30 fps. If it is determined that the frame is captured at 60 fps, the decoding unit is set to execute a decoding process at a rate of 30 fps while decimating one of two successive frames, as in step S509 above. If it is determined that the frame of interest is captured at 30 fps, the decoding unit is set to execute a decoding process of respective frames at 30 fps.

If it is determined that slow playback is in progress, the flow advances to step S524 to determine whether the frame of interest is captured at 60 or 30 fps. If it is determined that the frame is captured at 60 fps, the decoding unit is set to execute a decoding process at a rate of 30 fps without decimation, as in step S512 above. If it is determined that the frame of interest is captured at 30 fps, the decoding unit is set to play back respective frames at a rate of 15 fps.

The aforementioned control is made by the control unit 100 on the basis of the user's instruction input.

<JPEG2000 Decoding Method>

Figure 19:
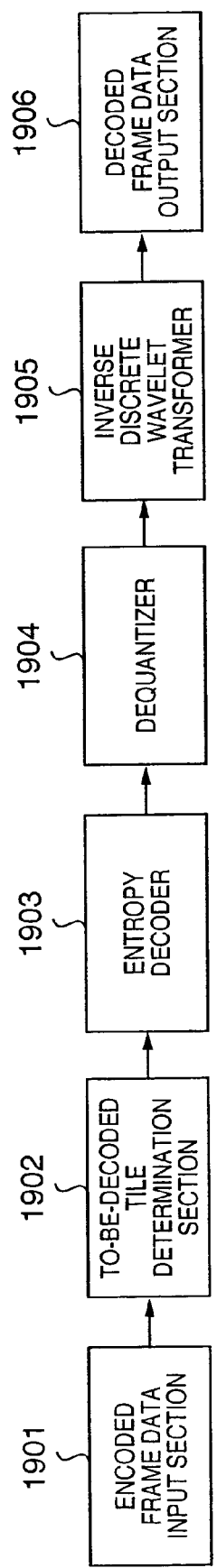
FIG. 19 is a schematic block diagram showing the arrangement of a JPEG2000 decoding unit in the first embodiment.
Figure 21:
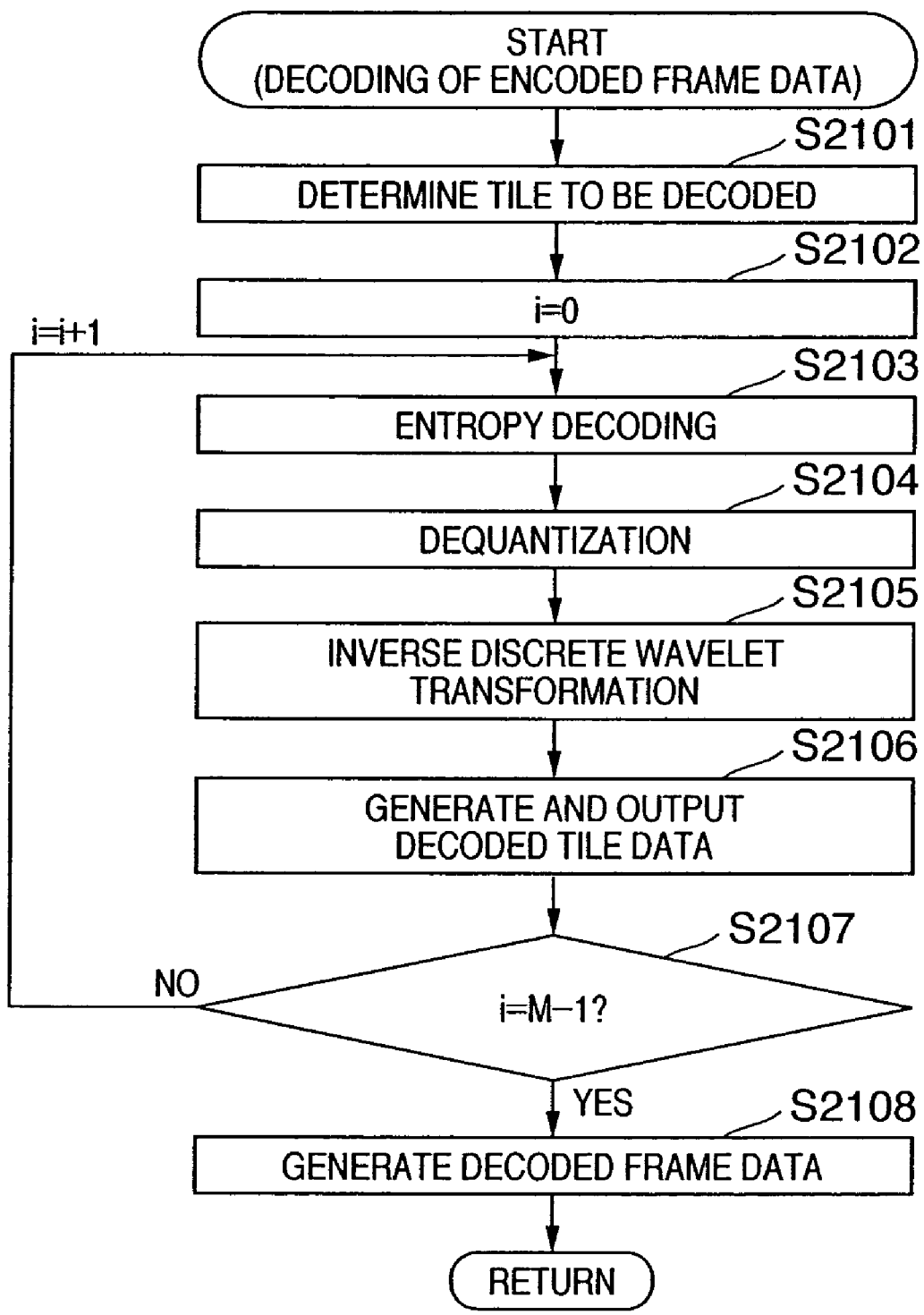
FIG. 21 is a flow chart showing the processing sequence of the JPEG2000 decoding unit in the first embodiment.

The processes in the JPEG2000 decoding unit 103 will be described below using FIG. 19 which is a block diagram of the JPEG2000 decoding unit, and the flow chart of FIG. 21.

Figure 20:
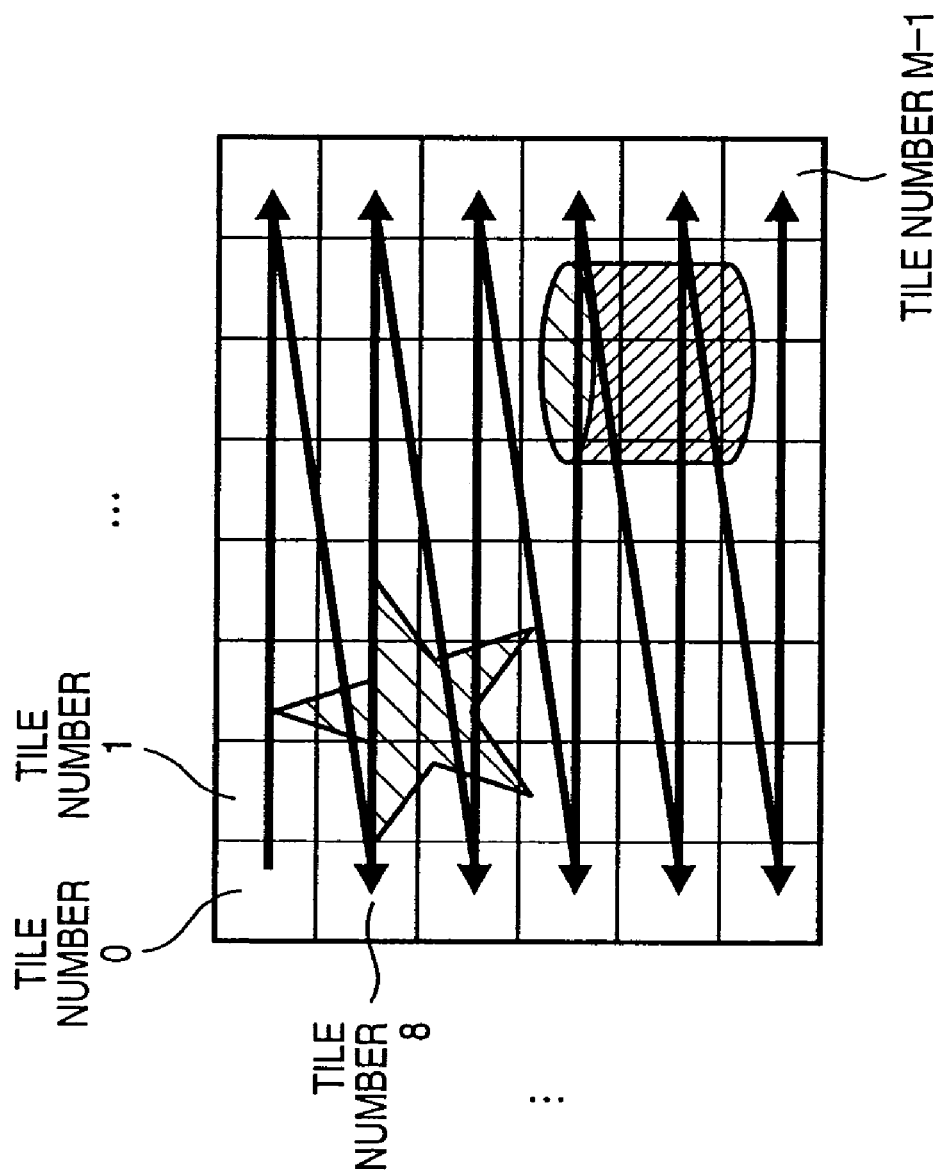
FIG. 20 shows the decoding order of tiles.

The encoded frame data and playback method information input to an encoded frame data input section 1901 are output to a to-be-decoded tile determination section 1902. The to-be-decoded tile determination section 1902 determines a tile to be decoded in turn from the upper left tile toward right neighboring tiles and also from the uppermost tile toward lower tiles, as shown in FIG. 20.

After the tiles to be decoded are determined, counter i (not shown) used to recognize a tile to be processed by the JPEG2000 decoding unit 103 is set to i=0 (step S2102). This step is skipped when i>0.

The encoded tile data to be decoded is input to an entropy decoder 1903 and undergoes entropy decoding, thus reclaiming quantized values (step S2103). The reclaimed quantized values are output to a dequantizer 1904. The dequantizer 1904 dequantizes the input quantized values to reconstruct discrete wavelet transform coefficients, and outputs them to an inverse discrete wavelet transformer 1905 (step S2104). Dequantization is done by:

$$Xr = Q \times q$$

where Q is the quantized value, q is the quantization step, and Xr is a decoded discrete wavelet transform coefficient.

The inverse discrete wavelet transformer 1905 computes the inverse discrete wavelet transforms (step S2105) by:

$$X(2n) = Y(2n) - \text{floor}\{(Y(2n-1) + Y(2n+1) + 2)/4\}$$

$$X(2n+1) = Y(2n+1) + \text{floor}\{(X(2n) + X(2n+2))/2\}$$

where $Y(2n)$ is a discrete wavelet transform coefficient of a lower-frequency subband, and $Y(2n+1)$ is that of a higher-frequency subband. Also, $X(n)$ is decoded data. These transformation formulas are used for one-dimensional data. By applying this transformation in turn in the horizontal and vertical directions, two-dimensional transformation is implemented. Then, decoded tile data is generated and is output to a decoded frame data output section 1906 (step S2106).

If tiles to be decoded still remain, the flow returns to step S2103; otherwise, the flow advances to step S2108 (step S2107).

The decoded frame data output section 1906 generates decoded frame data by arranging the decoded tile data in the order of i=0, . . . , M-1, and outputs that data (step S2108).

<Normal Playback Mode>

The implementation method of the normal playback mode will be described in detail below. Upon decoding a moving image, which is captured and recorded at a frame rate as high as 60 frames/sec or the like, the JPEG2000 decoding unit 103 decodes not all 60 frames, but only encoded data of 30 frames per sec as some of the 60 frames. More specifically, if f1, f2, f3, . . . define frames, one of every two neighboring frames is decoded like f1, f3, f5, . . . (or f2, f4, f6, . . . ).

Initially, one of every two neighboring frames is read out from encoded moving image data (captured and recorded at 60 frames/sec), which is read out by the reader 101 in FIG. 1 and is temporarily stored in the memory 102, and encoded data at 30 frames/sec are time-serially and sequentially transmitted to and decoded by the JPEG2000 decoding unit 103. A decoded image obtained by this process is sequentially written back to another area on the memory 102.

This decoded image is written on the display memory at a timing of 30 frames/sec.

Note that the display unit 60 has a display rate of 60 frames/sec (the display rate is not limited to 60 frames/sec, but any other rates may be used), as described above. That is, a display image is read out from the display memory at 60 frames/sec. Therefore, each frame of the decoded image is read out twice from the display memory.

In this case, a moving image can be displayed on the display area 400 in FIG. 4 to have image quality of 30 frames/sec, which is high enough for human visual recognition.

In this way, a decoded image, which does not impose any load on the decoder and can obscure visual deterioration compared to a case wherein encoded moving image data at 60 frames/sec is simply decoded, can be displayed.

<Slow Playback Mode>

The implementation method of the slow playback mode (½× speed) will be described in detail below. Upon decoding a moving image which is captured and recorded at a frame rate as high as 60 frames/sec or the like, all 60 frames are decoded by the JPEG2000 decoding unit 103 in this slow playback mode.

Initially, (all) encoded data at 60 frames/sec are time-serially transferred from encoded moving image data (captured and recorded at 60 frames/sec) which is read out by the reader 101 in FIG. 1 and is temporarily stored in the memory 102 to the JPEG2000 decoding unit 103 at the same frame rate (i.e., 30 frames/sec) as that in the normal playback mode, and are decoded. A decoded image obtained by this process is sequentially written back to another area on the memory 102. Therefore, the generation timing of the decoded image is the same as that in the normal playback mode.

Hence, the obtained decoded image is written in the display memory at a timing of 30 frames/sec as in the normal playback mode. That is, the load on the decoding process is equivalent to that in the normal playback mode.

As described above, the display unit 105 has a display rate of 60 frames/sec, and reads out a display image at 60 frames/sec.

In this slow playback mode as well, each frame of the decoded image is read out twice from the display memory.

In this case, a moving image can be displayed on the display area 400 in FIG. 4 to have image quality of 30 frames/sec, which is high enough for human visual recognition to assure smooth motion, although playback is done in the slow playback mode.

As described above, according to this embodiment, natural playback can be made in both the normal and slow playback modes.

In the embodiment described above, a moving image to be played back has a frame rate (60 frames/sec) twice that (30 frames/sec) of a normal moving image. In the normal playback mode (equal-speed playback), the moving image is decimated to ½ (one of every two successive frames is thrown away) and is played back at 30 frames/sec. In the slow playback mode, no decimation is made (zero frame decimation), and 60 frames are played back for 2 sec, i.e., the image is played back at the same frame rate of 30 frames/sec as in the normal playback mode. However, the present invention is not limited to these specific numerical values. That is, the present invention is characterized in that when a moving image, which is captured at a frame rate higher than a playback frame rate of a normal moving image and is obtained by compression-encoding respective frames independently, is given, the image is played back at a frame rate substantially equal to or close to a normal frame rate so as not to be perceived as "frame-by-frame display".

For example, if moving image data at 90 frames/sec is given, 90/30=3, and that image can be played back at 30 frames/sec using one of every three successive frames (by throwing away two frames from every three successive frames). On the other hand, when such moving image data is played back in the slow playback mode at a ½× speed, 90÷30÷2=1.5, and that image is played back using one of 1.5 frames (two of every three successive frames) (by throwing away one frame from every three frames). On the other hand, when such moving image data is played back in the slow playback mode at a ⅓× speed, 90÷30÷3=1, and that image can be played back at 30 frames/sec using one of one frame (i.e., the number of frames to be thrown away by decimation is zero). In any of these cases, substantially the same load is imposed on the decoding process when viewed from the processor. Also, divisible cases have been exemplified. However, in some cases, the frame rate is indivisible depending on that of an original moving image. Even in such case, it is desirable to play back an image at a frame rate near 30 frames/sec.

Note that the frame rate of 30 frames/sec has been exemplified as a playback frame rate. Alternatively, in order to meet a requirement of a user who can recognize or admit a satisfactory moving image even at 25 frames/sec, or to meet a requirement of a user who requests a high frame rate (e.g., 35 frames/sec) in some cases, the playback frame rate may be increased/decreased with reference to 30 frames/sec. In such case, a playback process is executed after the decimation ratio is calculated to meet the requested frame rate. The playback frame rate may be set using a playback frame rate input field, which is assured on, e.g., an arbitrary playback window.

Second Embodiment

In the above embodiment, an original moving image which has a frame rate higher than that of a normal moving image is played back at the frame rate of the normal moving image in the normal and slow playback modes, so as not to be perceived as a frame-by-frame display image.

The second embodiment will exemplify a case wherein the image quality of frames in the slow playback mode is improved.

Figure 22:
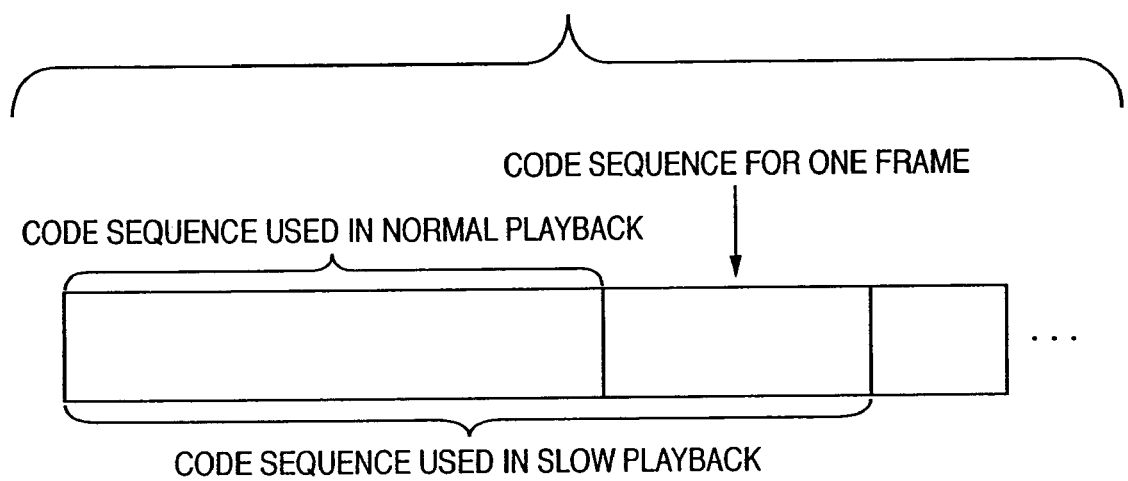
FIG. 22 shows a code sequence used in the second embodiment.

Since JPEG2000 is hierarchical encoding based on wavelet transformation, a significant image can be reconstructed by decoding some of the obtained encoded data (from a subblock of a low-frequency component to a subblock of an arbitrary high-frequency component). Hence, in the second embodiment, by exploiting the nature of JPEG2000 encoded frame data, a code size that an image processing apparatus can play back in real time in one frame is decoded in a normal playback mode, and codes more than that code size are decoded in a slow playback mode, as shown in FIG. 22. Hence, a slow playback image can have higher quality than a normal playback image. Put simply, for example, a "code sequence used in normal playback" in FIG. 22 includes LL, HL1, LH1, HH1, HL2, LH2, and HH2 in the subbands of the three layers in FIG. 7, and a "code sequence used in slow playback" also includes HL3, LH3, and HH3 in addition to these subbands.

<Encoded Moving Image Data Generation Method>

In this embodiment, encoded moving image data is generated to allow display at 60 frames/sec as in the first embodiment.

<Encoded Moving Image Data Decoding Method>

Figure 23:
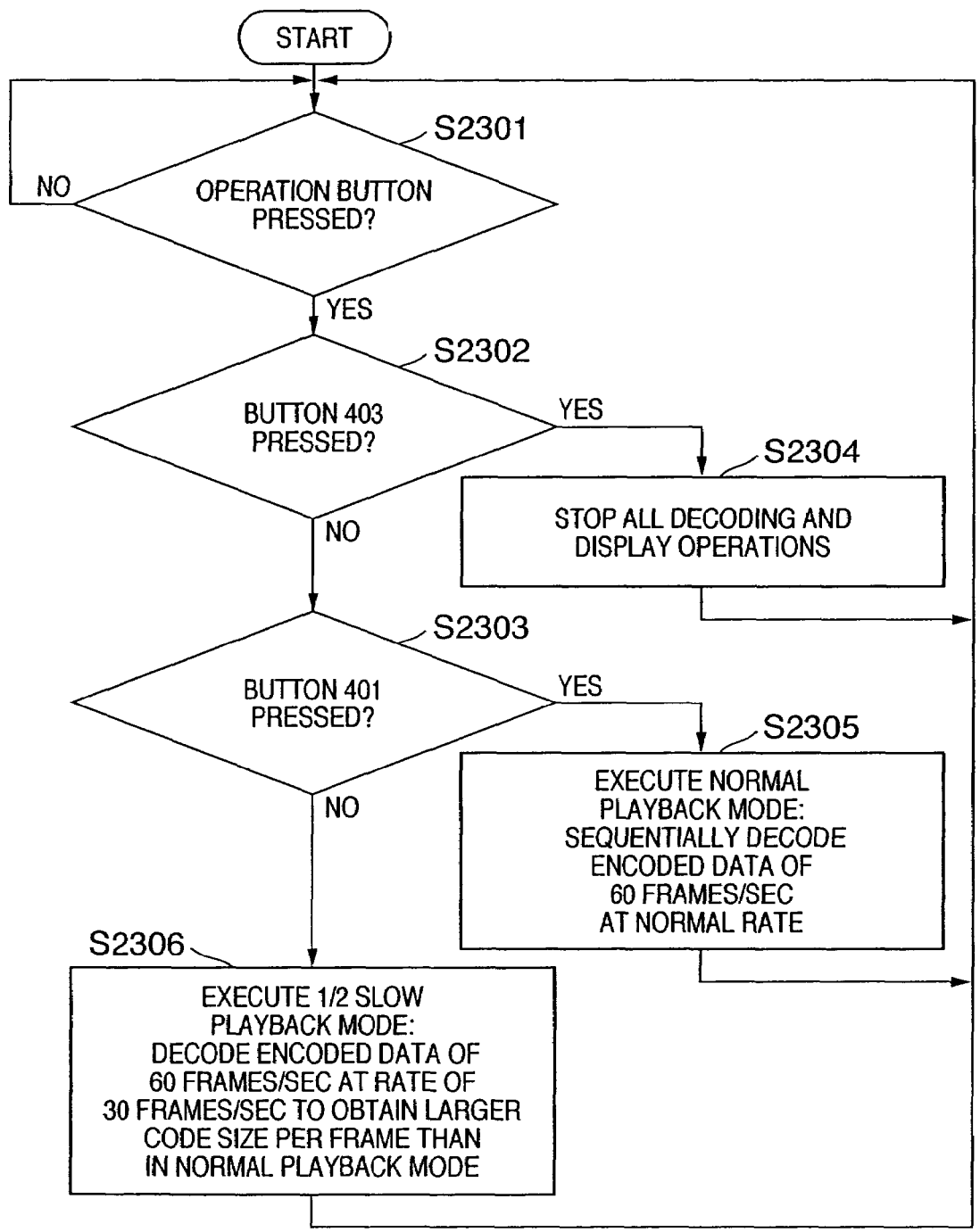
FIG. 23 is a flow chart showing a control sequence of an apparatus on the basis of an instruction of a display unit 105 (instruction input unit 106) in the second embodiment.

The arrangement of a decoding apparatus in this embodiment is substantially the same as that of the decoding apparatus of the first embodiment. Hence, the block diagram of the decoding apparatus of this embodiment and its display window substitute FIGS. 1 to 4. However, FIG. 23 shows a new processing flow. The processing sequence is substantially the same as that in FIGS. 5A and 5B.

<Normal Playback Mode (Step S2305 in FIG. 23)>

The decoding apparatus of this embodiment can decode and display at 60 frames/sec in the normal playback mode.

The decoding method of each encoded frame data will be described below.

Figure 24:
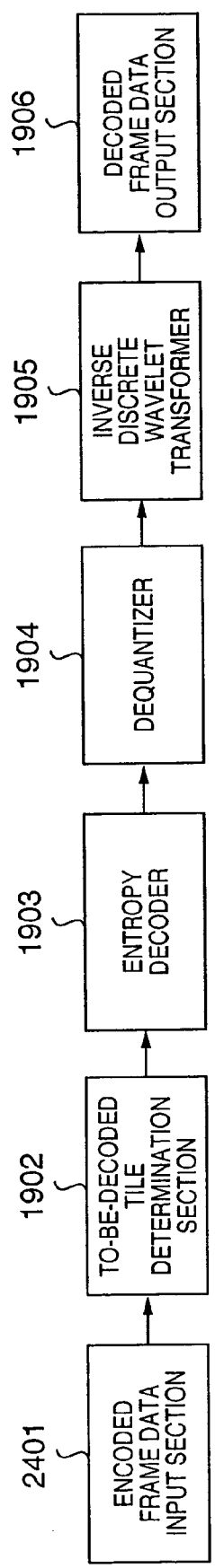
FIG. 24 is a schematic block diagram showing the arrangement of a JPEG2000 decoding unit in the second embodiment.

FIG. 24 is a block diagram of the JPEG2000 decoding unit 103 of the present invention. In FIG. 24, the encoded frame data input section 1901 in the block diagram of the first embodiment is replaced by an encoded frame data input section 2401.

Figure 25:
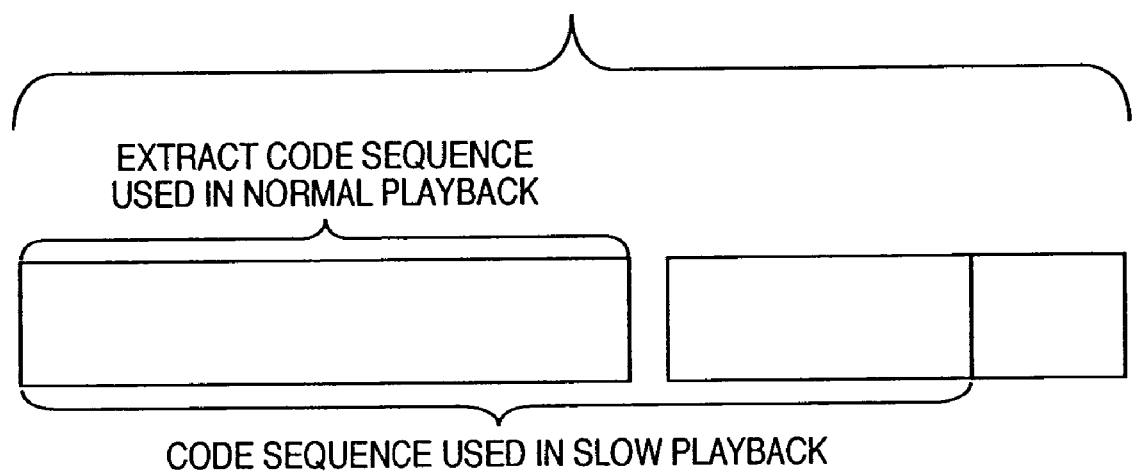
FIG. 25 is an explanatory view of extraction of a code sequence in a normal playback mode.

When encoded frame data is input to the encoded frame data input section 2401, the control unit 100 (not shown) separates codes that can be decoded at 60 frames/sec, as shown in FIG. 25, and inputs them to the entropy decoder 1903.

Since the processes of the entropy decoder 1903 and subsequent sections are the same as those in the first embodiment, a description thereof will be omitted. Note that the decodable code size may be changed as needed in correspondence with the processing performance of a playback apparatus.

<Slow Playback Mode (Step S2306 in FIG. 23)>

This slow playback mode decodes and plays back all frames at 30 frames/sec. A decoding method that can implement this process will be described below.

Figure 26:
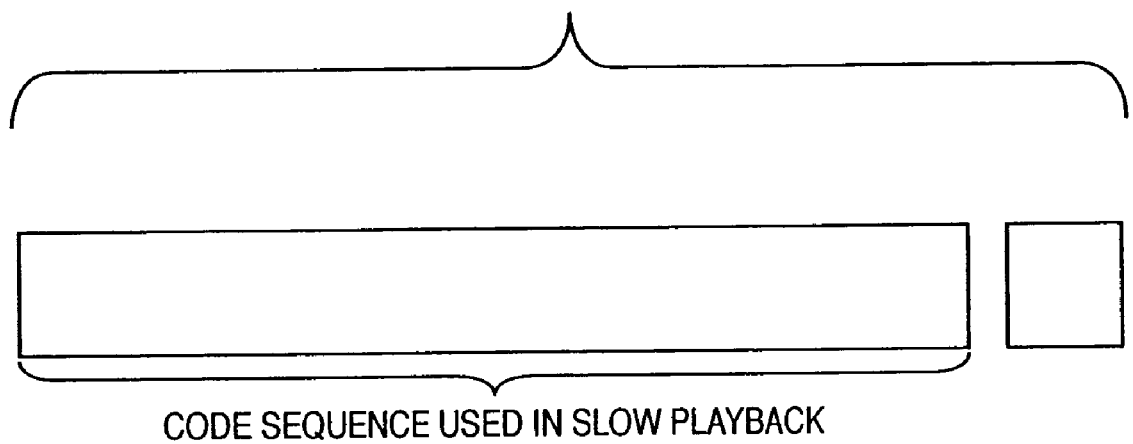
FIG. 26 is an explanatory view of extraction of a code sequence in a slow playback mode.

When encoded frame data is input to the encoded frame data input section 2401, the control unit 100 (not shown) separates codes that can be decoded at 30 frames/sec, as shown in FIG. 26, and inputs them to the entropy decoder 1903.

Since the processes of the entropy decoder 1903 and subsequent sections are the same as those in the first embodiment, a description thereof will be omitted.

The aforementioned process can be implemented for the following reason. That is, frames are played back at a high frame rate of 60 frames/sec in the normal playback mode, while they are played back at 30 frames/sec in the slow playback mode. Hence, the processing load on the control unit or decoding can be reduced to ½. Accordingly, sub-blocks (subbands) of higher frequency components can be decoded.

As described above, the code size that the image processing apparatus can play back in real time per frame in the normal playback mode (60 frames/sec) can be decoded, and a larger code size per frame can be decoded in the slow playback mode (30 frames/sec). Even in the slow playback mode, the playback frame rate is sufficiently high. In this way, a slow playback image can have higher quality than a normal playback image.

Third Embodiment

The first embodiment has exemplified the slow playback method that can play back a smooth moving image, and the second embodiment has exemplified the slow playback method that can finely play back respective frames. The third embodiment can display a higher-quality slow playback image by combining the methods of these two embodiments.

<Encoded Moving Image Data Generation Method>

In the third embodiment as well, encoded moving image data is generated to allow display at 60 frames/sec as in the first embodiment.

<Encoded Moving Image Data Decoding Method>

The arrangement of a decoding apparatus of the third embodiment is substantially the same as that of the decoding apparatus of the first embodiment. Hence, the block diagram of the decoding apparatus of this embodiment and its display window substitute FIGS. 1 to 4. However, FIG. 27 shows a new processing flow.

Figure 27:
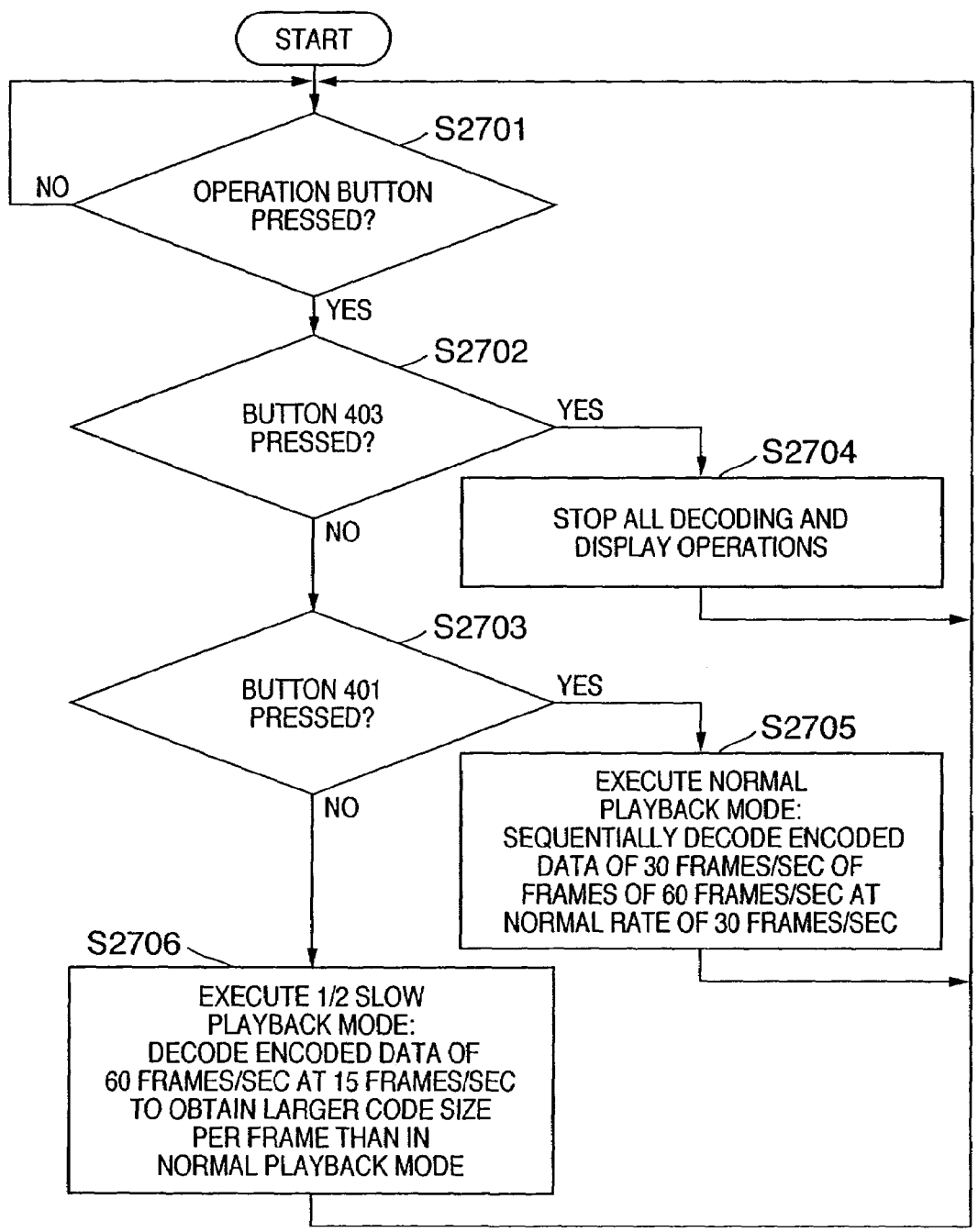
FIG. 27 is a flow chart showing a control sequence of an apparatus on the basis of an instruction of a display unit 105 (instruction input unit 106) in the third embodiment.

Normal Playback Mode (Step S2705 in FIG. 27)

The decoding apparatus of the third embodiment can decode at 30 frames/sec in the normal playback mode, and can decode and play back while skipping every other frames at this frame rate (by decimating two successive frames to one frame). The decoding method of each encoded frame data will be described below.

Figure 28:
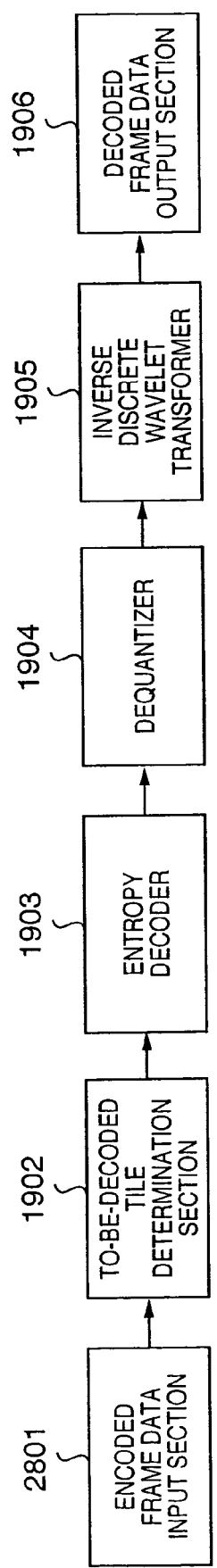
FIG. 28 is a schematic block diagram showing the arrangement of a JPEG2000 decoding unit in the third embodiment.

FIG. 28 is a block diagram of the JPEG2000 decoding unit 103 of the present invention. In FIG. 28, the encoded frame data input section 1901 in the block diagram of the first embodiment is replaced by an encoded frame data input section 2801.

When encoded frame data is input to the encoded frame data input section 2801, the control unit 100 (not shown) separates codes that can be decoded at 30 frames/sec, as shown in FIG. 25, and inputs them to the entropy decoder 1903. Since the processes of the entropy decoder 1903 and subsequent sections are the same as those in the first embodiment, a description thereof will be omitted.

<Slow Playback Mode (Step S2706 in FIG. 27)>

Respective frames are decoded and played back at 15 frames/sec. A decoding method that can implement this process will be described below.

When encoded frame data is input to the encoded frame data input section 2801, the control unit 100 (not shown) separates codes that can be decoded at 15 frames/sec (sub-blocks of higher frequency components are also selected as those to be decoded), as shown in FIG. 26, and inputs them to the entropy decoder 1903.

Since the processes of the entropy decoder 1903 and subsequent sections are the same as those in the first embodiment, a description thereof will be omitted.

As described above, by combining the first and second embodiments, the quality of a slow playback image can be further improved.

Fourth Embodiment

A person who studies golf swings and is curious about swings of other players may capture a swing of that player at a high frame rate. Then, that person may appreciate the swing again and again while playing back frame groups at the high frame rate.

Such person may want to automatically play back the frame groups at the high frame rate during normal playback or fast forwarding in place of manually switching the normal playback mode and slow playback mode as in the above embodiments.

Hence, a moving image playback apparatus of this embodiment has a manual slow playback mode and an automatic slow playback mode. When the former mode is selected, high-quality slow playback is made upon reception of a slow playback instruction. On the other hand, when the latter mode is selected, frames at a high frame rate automatically undergo high-quality slow playback irrespective of the presence/absence of a slow playback instruction. An example will be explained below.

<Encoded Moving Image Data Generation Method>

In this embodiment, encoded moving image data is generated to allow display at 60 frames/sec as in the first embodiment.

<Decoding/Playback>

A decoding apparatus used in this embodiment is substantially the same as that of the first embodiment.

Figure 29:
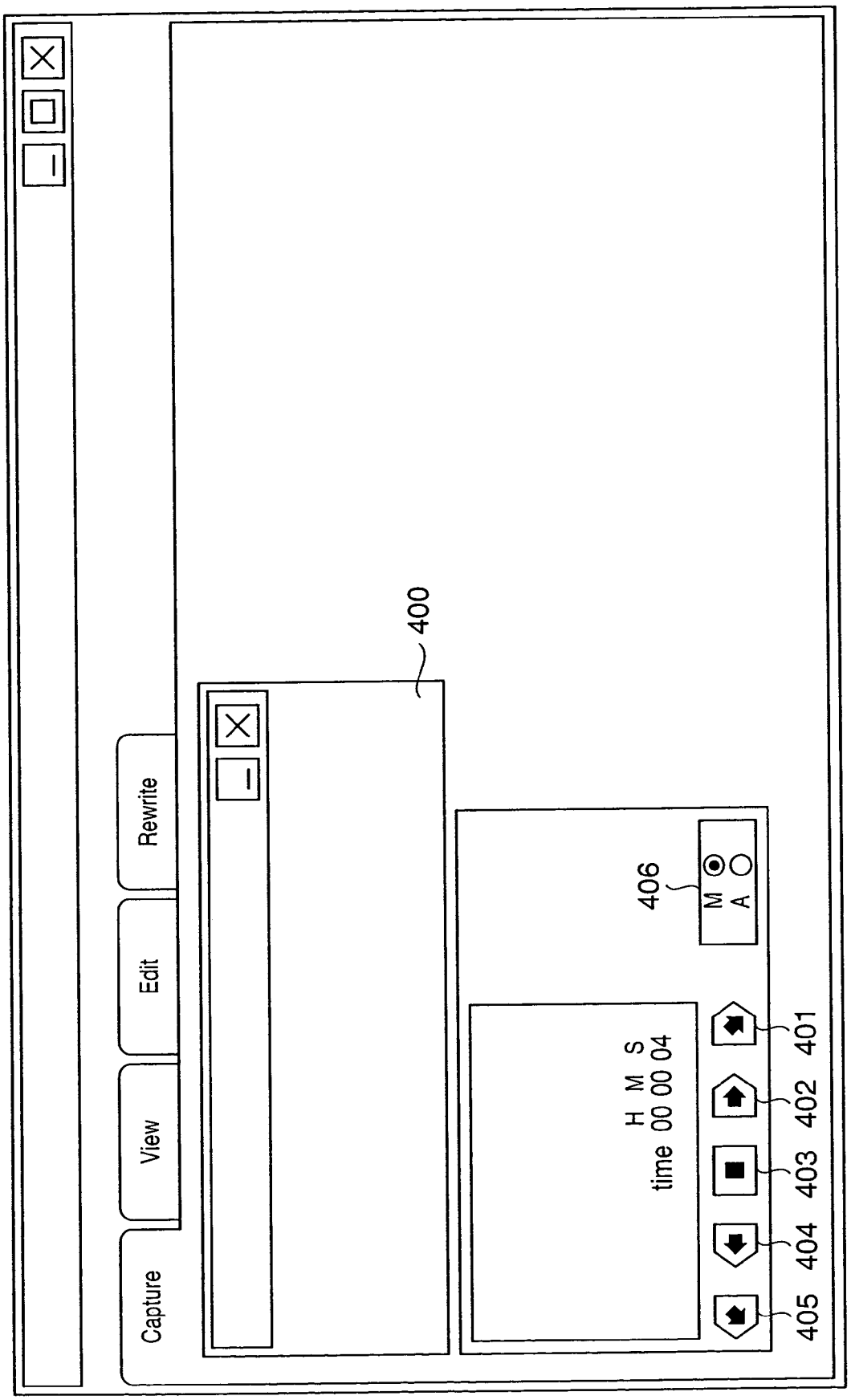
FIG. 29 shows an example of a display unit on the decoding/playback side (image processing apparatus)

FIG. 29 shows a playback operation window in this embodiment, which is slightly different from the playback window in the first embodiment. This playback operation window comprises new switches (radio buttons) 406 used to switch between the manual slow playback mode and automatic slow playback mode. The user can change a slow playback mode by selecting one of these switches.

The flow of operations required until encoded moving image data is actually decoded and displayed will be described in detail below using FIG. 30. Note that only the operation control of playback will be explained. The reverse playback modes (corresponding to uses of buttons 404 and 405) can be easily understood by those who are skilled in the art by reversing the time axis in the two different playback modes (normal and slow playback modes) to be described below, and replacing the buttons 401 and 405, and 402 and 404 with each other. Hence, a detailed description thereof will be omitted.

Figure 30:
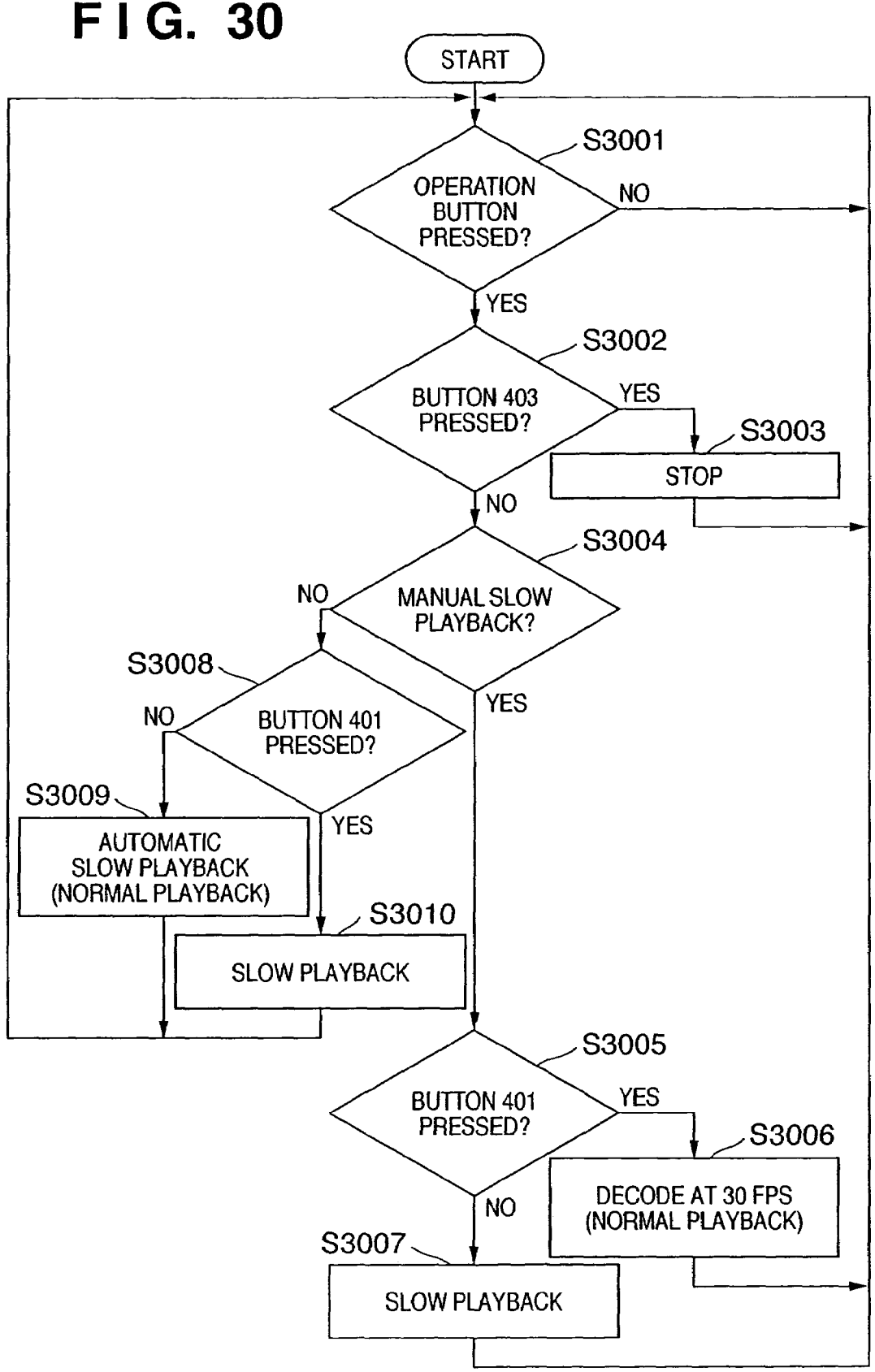
FIG. 30 is a flow chart showing a control sequence of an apparatus on the basis of an instruction of a display unit 105 (instruction input unit 106) in the fourth embodiment.

Referring to FIG. 30, it is checked in step S3001 if the user has pressed one of the playback and stop buttons 401 to 403. Note that the "pressing" operation means an operation for designating (clicking) a displayed button using the instruction input unit 106 (mouse or the like) in FIG. 1, but its implementation means is not particularly limited.

If the user has pressed one of the buttons 401 to 403, the pressed button is then specified in subsequent steps. Note that the order of these checking steps is not particularly limited. In the description of FIG. 30, it is checked in step S3002 if the user has pressed the button 403 (stop button). If it is determined that the user has pressed the button 403, the flow advances to step S3003 to stop all decoding and playback operations.

If it is determined that the user has not pressed the button 403, a slow playback mode selected using the switches 406 is determined in step S3004. If the manual slow playback mode is selected by the switch 406, it is determined in step S3005 whether or not the user has pressed the button 401 (normal playback mode), i.e., if he or she has pressed the button 401 or the button 402 (slow playback mode).

If the user has pressed the button 401, frames are decoded at 30 fps (normal playback) in step S3006; otherwise, slow playback is executed in step S3007. In this slow playback, a frame group at 30 fps is decoded at 15 fps without decimation, and a frame group at 60 fps is decoded at a rate of 30 fps without decimation.

If it is determined in step S3004 that the automatic slow playback mode is selected, it is checked in step S3008 if the user has pressed the button 401. If NO in step S3008, a frame group at 60 fps is automatically decoded at 30 fps without decimation to execute a slow playback process, and a frame group at 30 fps is automatically decoded at a rate of 30 fps without decimation to execute normal playback.

On the other hand, if it is determined in step S3008 that the user has pressed the button 401, slow playback is executed in step S3010. In this slow playback, a frame group at 30 fps is decoded at 15 fps without decimation, and a frame group at 60 fps is decoded at 30 fps without decimation.

<JPEG2000 Decoding Method>

Since the JPEG2000 decoding method is the same as that in the first embodiment, a description thereof will be omitted.

<Normal Playback (Step S3006)>

Since the normal playback process is the same as that in the first embodiment, a description thereof will be omitted.

<Slow Playback Mode (steps S3007 and S3010)>

The implementation method of the automatic slow playback mode (½× speed) will be described in detail below.

Encoded moving image data which includes frames at 60 frames/sec (fps) and those at 30 fps is displayed at a display frame rate of 30 fps in this automatic slow playback mode.

Initially, (all) encoded data at 60 frames/sec are time-serially transferred from encoded moving image data (captured and recorded at mixed rates) which is read out by the reader 101 in FIG. 1 and is temporarily stored in the memory 102 to the JPEG2000 decoding unit 103 at a transfer rate of 30 frames/sec, and are decoded.

A decoded image obtained by this process is sequentially written in the display memory at a timing of 30 frames/sec.

As in the above description, the display unit 105 displays at 60 frames/sec.

In this case, a scene that the user is curious about of a moving image displayed on the display area 400 in FIG. 4 is smoothly displayed in the slow playback mode. This process is done automatically.

As described above, the moving image playback apparatus of the fourth embodiment has the manual slow playback mode and automatic slow playback mode. When the former mode is selected, high-quality slow playback is made upon reception of a slow playback instruction. On the other hand, when the latter mode is selected, frames at a high frame rate undergo high-quality slow playback irrespective of the presence/absence of a slow playback instruction.

Fifth Embodiment

The fourth embodiment has exemplified the method of decoding and playing back encoded moving image data, which consists of encoded frame data of high- and low-frame rate groups, by two different decoding methods.

The fifth embodiment will exemplify a method of decoding and playing back encoded moving image data, which consists of encoded frame data of high- and low-definition frame groups, by two different decoding methods.

<Overview of Encoded Moving Image Data>

FIG. 2 is a schematic view of a digital camera 201 which can capture a moving image. This camera is designed to be able to capture a low-definition moving image by depressing a moving image capture button shown in FIG. 2 to its half stroke position, and to be able to capture a high-definition (lossless in this embodiment) moving image by depressing that button to its full stroke position, after the latter one of a still image capture mode and moving image capture mode is selected. For example, when the motion speed/direction of an object to be captured abruptly changes, an image of the object is normally captured at the half stroke position. Before and after that change takes place, an image of the object is captured at the full stroke position. As a result, with a series of capture operations, a moving image which includes both low- and high-definition scenes can be recorded.

Figure 31:
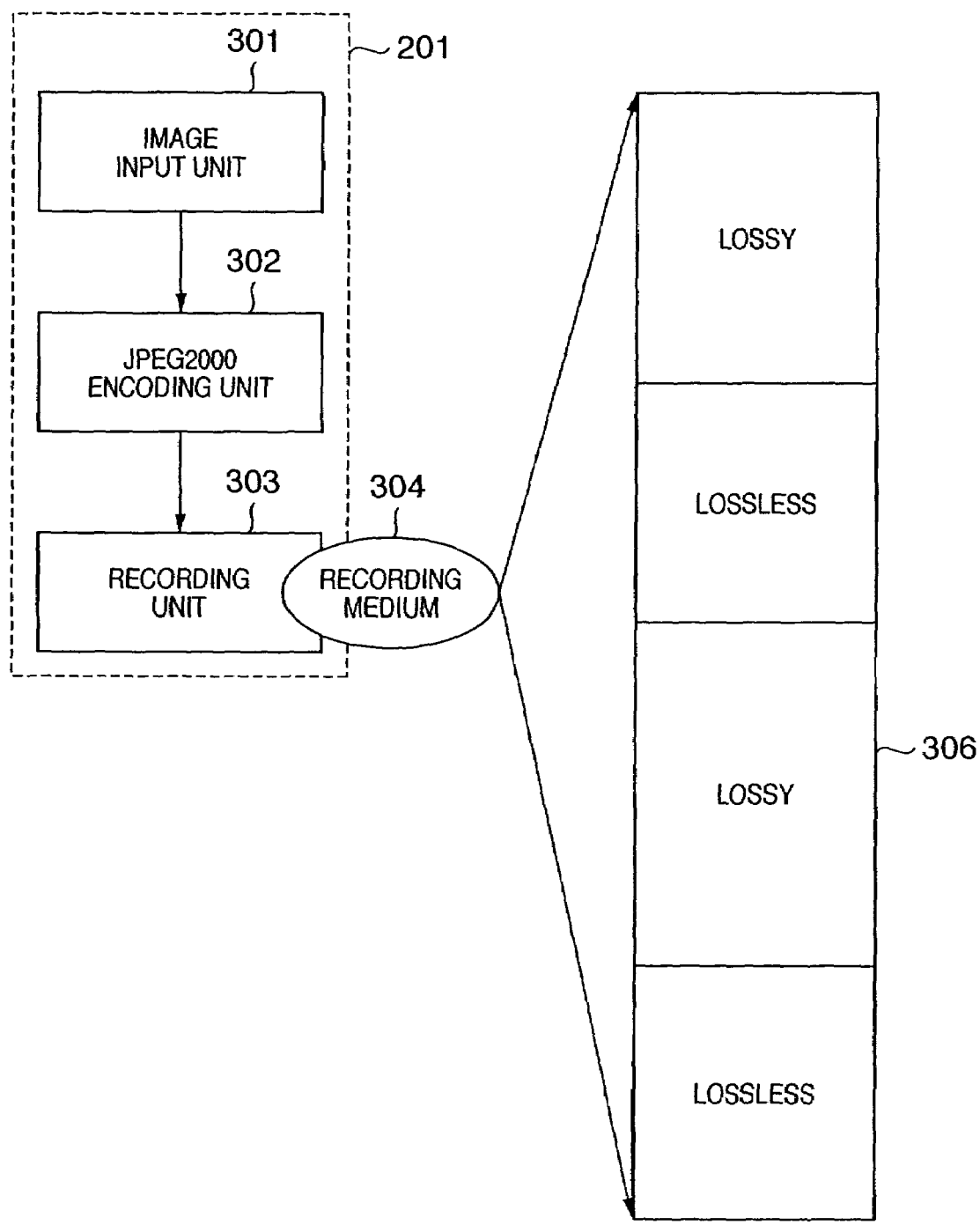
FIG. 31 is a schematic diagram showing functions associated with encoding and recording in a camera.

FIG. 31 is a schematic diagram of a process for encoding and recording frame images captured by the digital camera 201. In FIG. 31, reference numeral 306 denotes an encoded moving image stream.

The encoding method is substantially the same as that in the first embodiment, except that a high-definition frame undergoes lossless encoding, and the recording method is the same as that in the first embodiment. Note that the frame rate of both high- and low-definition frames is 30 fps.

<Outline of JPEG2000 Encoding Method>

Since the JPEG2000 encoding method of the fifth embodiment is substantially the same as that in the first embodiment, except that "1" is assigned to the quantization step of a high-definition frame, a detailed description thereof will be omitted.

<Decoding/playback>

A decoding apparatus used in this embodiment is substantially the same as that of the fourth embodiment.

A playback operation window of this embodiment is the same as that of the fourth embodiment shown in FIG. 29. That is, the user can change a slow playback mode by selecting one of the switches 406.

The flow of operations required until encoded moving image data is actually decoded and displayed will be described in detail below using FIG. 32. Note that only the operation control of playback will be explained. The reverse playback modes (corresponding to uses of buttons 404 and 405) can be easily understood by those who are skilled in the art by reversing the time axis in the two different playback modes (normal and slow playback modes) to be described below, and replacing the buttons 401 and 405, and 402 and 404 with each other. Hence, a description of such modes will be omitted.

Figure 32:
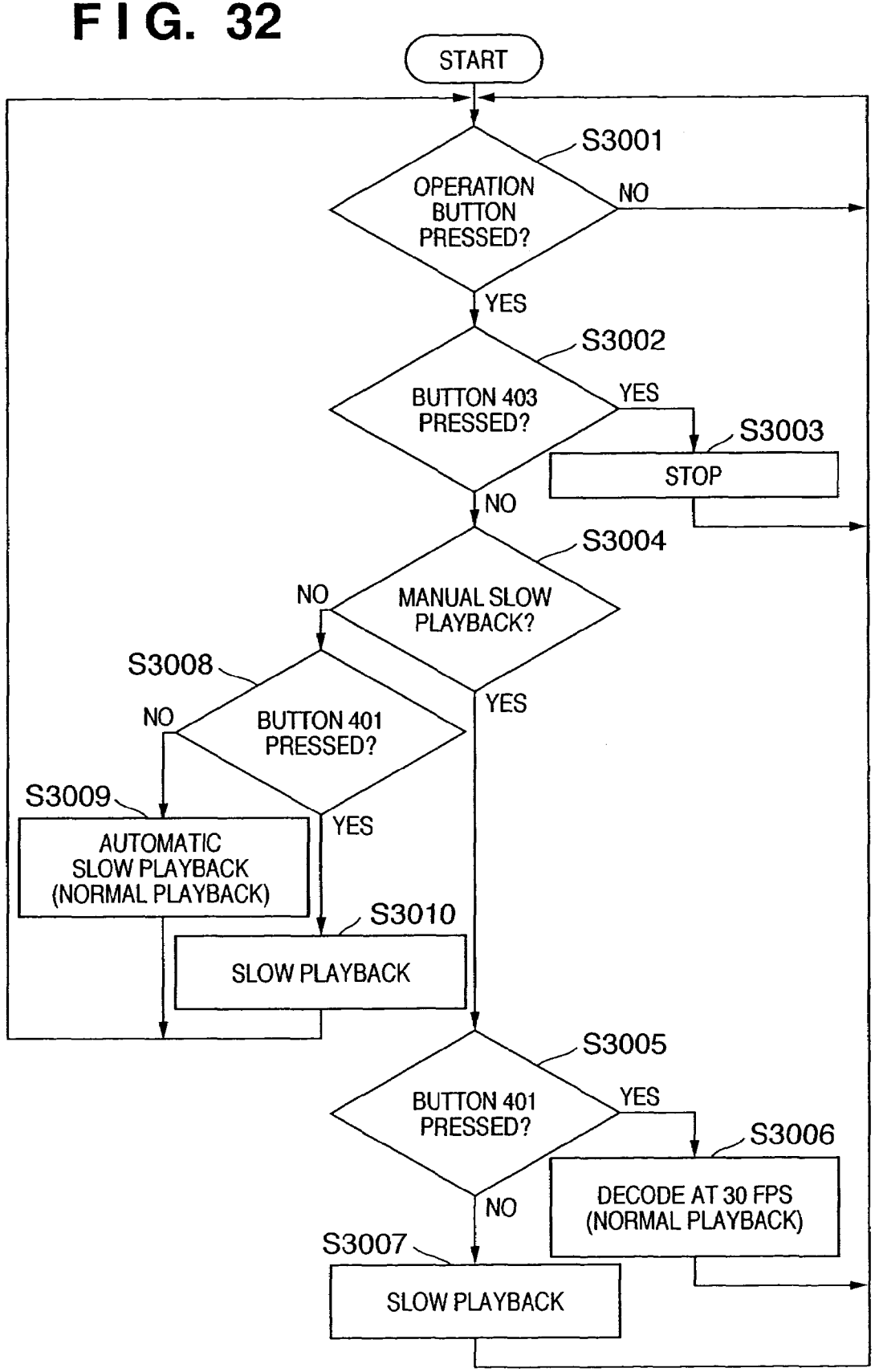
FIG. 32 is a flow chart showing a control sequence of an apparatus on the basis of an instruction of a display unit 105 (instruction input unit 106) in the fifth embodiment.

Referring to FIG. 32, it is checked in step S3001 if the user has pressed one of the playback and stop buttons 401 to 403. Note that the "pressing" operation means an operation for designating (clicking) a displayed button using the instruction input unit 106 (mouse or the like) in FIG. 1, but its implementation means is not particularly limited.

If the user has pressed one of the buttons 401 to 403, the pressed button is then specified in subsequent steps. Note that the order of these checking steps is not particularly limited. In the description of FIG. 32, it is checked in step S3002 if the user has pressed the button 403 (stop button). If it is determined that the user has pressed the button 403, the flow advances to step S3003 to stop all decoding and playback operations.

If it is determined that the user has not pressed the button 403, a slow playback mode selected using the switches 406 is determined in step S3004. If the manual slow playback mode is selected, it is determined in step S3005 whether or not the user has pressed the button 401 (normal playback mode), i.e., if he or she has pressed the button 401 or the button 402 (slow playback mode).

If the user has pressed the button 401, normal playback is executed in step S3006. This normal playback is to decode all frame data of a low-definition frame group and to decode data of a high-definition frame group, which can reproduce the same resolution and same image quality as those of the low-definition frame group.

If the user has not pressed the button 401, slow playback is executed in step S3007. This slow playback decodes and displays a low-definition frame group at 15 fps, and decodes a high-definition frame group by lossless decoding and displays decoded frames at 30 fps.

If it is determined in step S3004 that the automatic slow playback mode is selected, it is checked in step S3008 if the user has pressed the button 401.

If NO in step S3008, normal playback that automatically plays back a high-definition frame group in the slow playback mode is executed in step S3009. On the other hand, if it is determined in step S3008 that the user has pressed the button 401, slow playback is executed in step S3010. In this slow playback, a low-definition frame group is decoded and displayed at 15 fps, and a high-definition frame group is decoded by lossless decoding and decoded frames are displayed at 30 fps.

<JPEG2000 Decoding Method>

The JPEG2000 decoding method is the same as that in the first embodiment.

<Normal Playback (Step S3006)>

The normal playback process is the same as that in the first embodiment.

<Slow Playback Mode (steps S3007 and S3010)>

The slow playback process is the same as that in the first embodiment.

<Automatic Slow Playback (Step S3009)>

The implementation method of the automatic slow playback mode (½× speed) will be described in detail below. In this automatic slow playback mode, all data of both high- and low-definition frames are decoded and displayed. The user can browse high-definition frames in the slow playback mode without issuing any instruction.

Initially, (all) encoded data at 60 frames/sec are time-serially transferred from encoded moving image data (captured and recorded at mixed rates) which is read out by the reader 101 in FIG. 1 and is temporarily stored in the memory 102 to the JPEG2000 decoding unit 103 at a transfer rate of 30 frames/sec, and are decoded.

A decoded image obtained by this process is sequentially written in the display memory at a timing of 30 frames/sec. As in the above embodiment, the display unit 105 displays at 60 frames/sec.

In this case, a scene that the user is curious about of a moving image displayed on the display area 400 in FIG. 4 is expressed by high-definition data and is displayed in the slow playback mode. This process is done automatically.

As described above, the moving image playback apparatus of the fifth embodiment has the manual slow playback mode and automatic slow playback mode. When the former mode is selected, high-quality slow playback is made upon reception of a slow playback instruction. On the other hand, when the latter mode is selected, frames at a high frame rate undergo high-definition slow playback irrespective of the presence/absence of a slow playback instruction.

Sixth Embodiment

The fourth embodiment has exemplified the method of decoding and playing back encoded moving image data, which consists of encoded frame data of high- and low-frame rate groups, by two different decoding methods.

The fifth embodiment has exemplified the method of decoding and playing back encoded moving image data, which consists of encoded frame data of high- and low-definition frame groups, by two different decoding methods.

The sixth embodiment will exemplify a method of decoding and playing back encoded moving image data, which consists of encoded frame data of a high-quality frame group that has a high frame rate and high definition, and a low-quality frame group that has low frame rate and low definition, by two different decoding methods.

<Overview of Encoded Moving Image Data>

Figure 33:
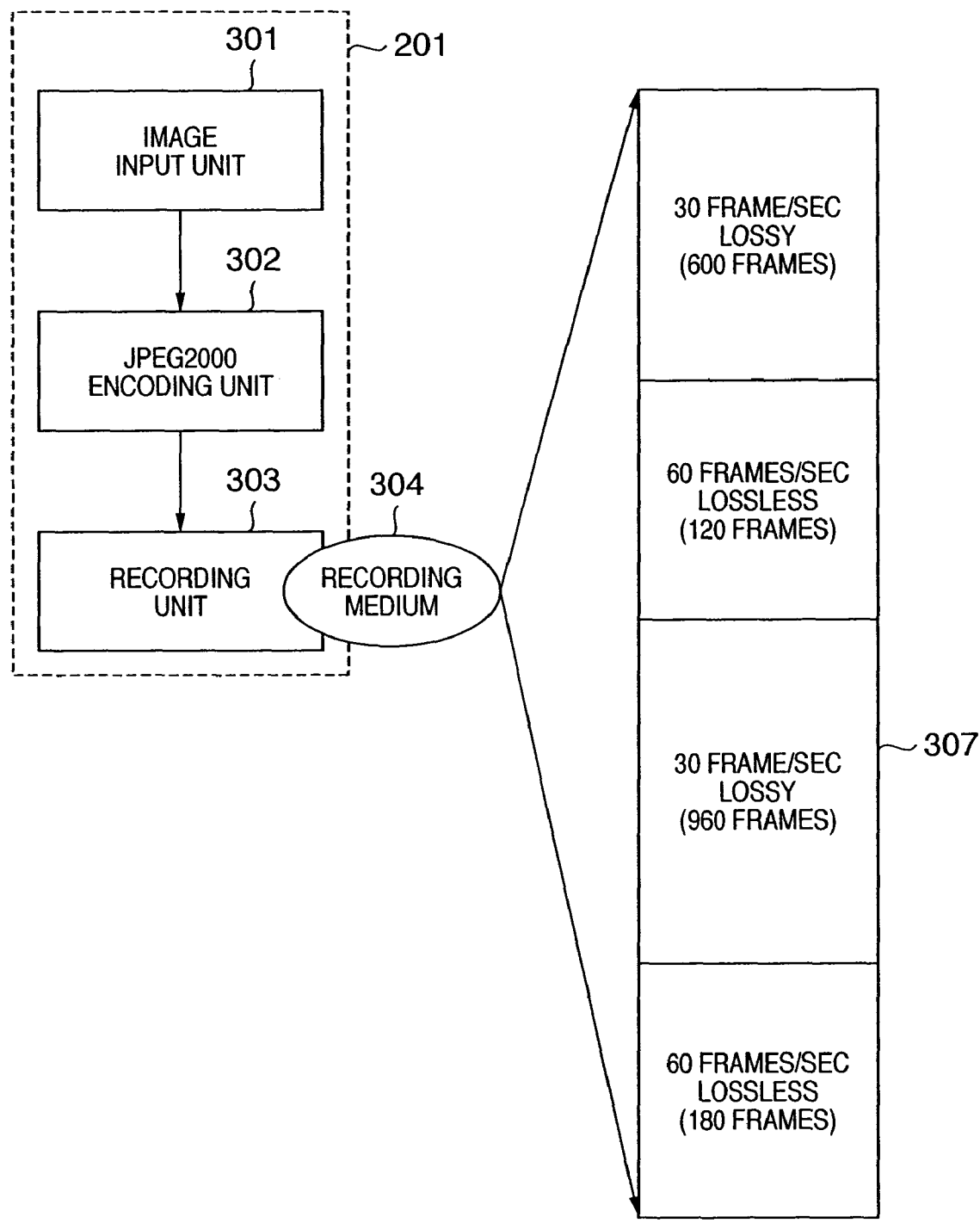
FIG. 33 is a schematic diagram showing functions associated with encoding and recording in a camera.

FIG. 33 is a schematic diagram of a process for encoding and recording frame images captured by the digital camera 201. In FIG. 33, reference numeral 307 denotes an encoded moving image stream.

In the encoding method, high-quality frames are encoded by lossless encoding at 60 fps, and low-quality frames are encoded by lossy encoding at 30 fps. Note that the recording method is the same as that in the first embodiment.

<Outline of JPEG2000 Encoding Method>

Since the JPEG2000 encoding method of this embodiment is substantially the same as that in the first embodiment, except that "1" is assigned to the quantization step of a high-definition frame, a detailed description thereof will be omitted.

<Decoding/Playback>

A decoding apparatus used in this embodiment is substantially the same as that of the fifth embodiment.

A playback operation window of this embodiment is the same as that of the fifth embodiment shown in FIG. 29. That is, the user can change a slow playback mode by selecting one of the switches 406.

The flow of operations required until encoded moving image data is actually decoded and displayed will be described in detail below using FIG. 34. Note that only the operation control of playback will be explained. The reverse playback modes (corresponding to uses of buttons 404 and 405) can be easily understood by those who are skilled in the art by reversing the time axis in the two different playback modes (normal and slow playback modes) to be described below, and replacing the buttons 401 and 405, and 402 and 404 with each other. Hence, a description of such modes will be omitted.

Figure 34:
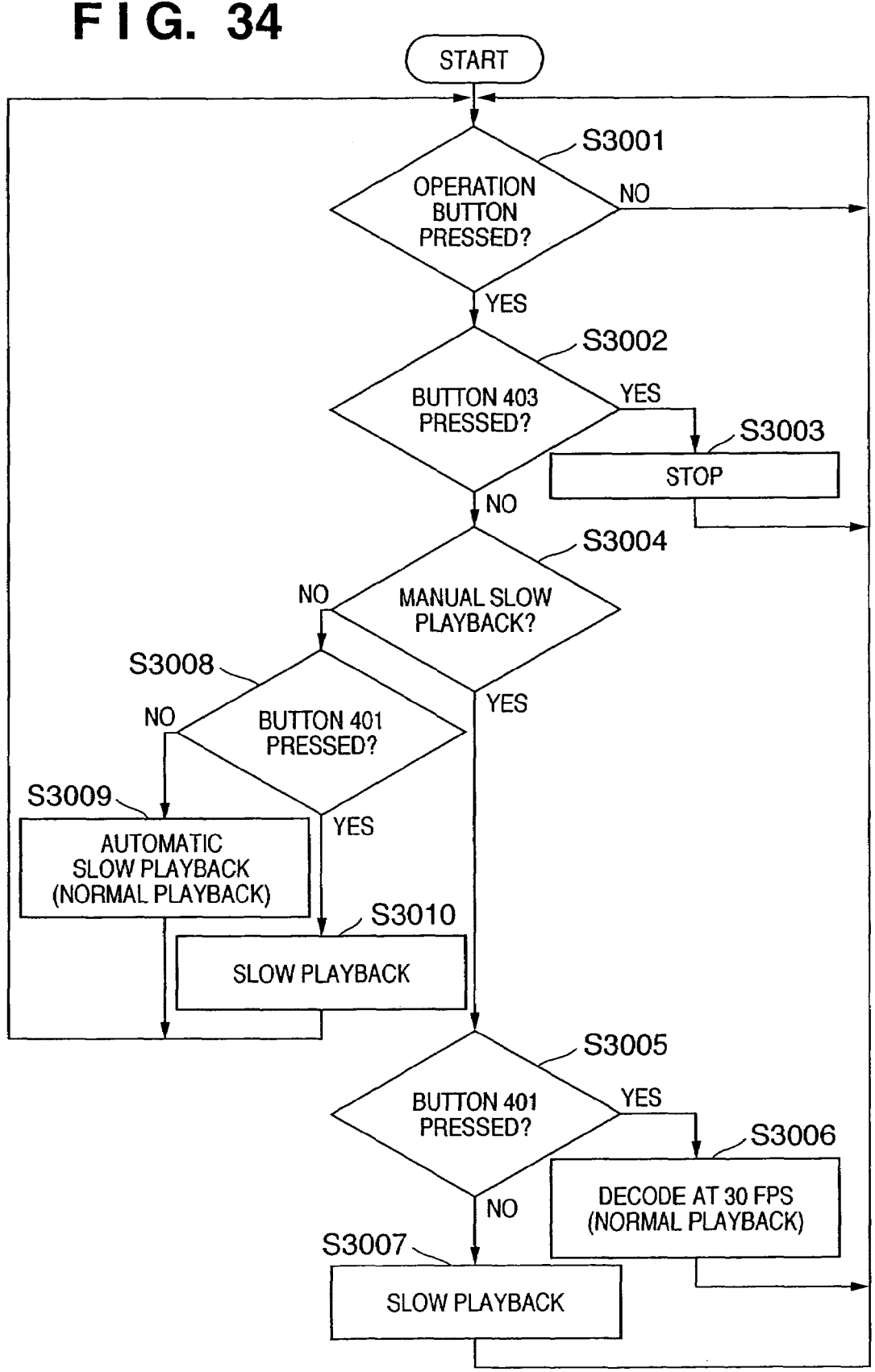
FIG. 34 is a flow chart showing a control sequence of an apparatus on the basis of an instruction of a display unit 105 (instruction input unit 106) in the sixth embodiment.

Referring to FIG. 34, it is checked in step S3001 if the user has pressed one of the playback and stop buttons 401 to 403. Note that the "pressing" operation means an operation for designating (clicking) a displayed button using the instruction input unit 106 (mouse or the like) in FIG. 1, but its implementation means is not particularly limited.

If the user has pressed one of the buttons 401 to 403, the pressed button is then specified in subsequent steps. Note that the order of these checking steps is not particularly limited. In the description of FIG. 34, it is checked in step S3002 if the user has pressed the button 403 (stop button). If it is determined that the user has pressed the button 403, the flow advances to step S3003 to stop all decoding and playback operations.

If it is determined that the user has not pressed the button 403, the selected slow playback mode is determined in step S3004. If the manual slow playback mode is selected, it is determined in step S3005 whether or not the user has pressed the button 401 (normal playback mode), i.e., if he or she has pressed the button 401 or the button 402 (slow playback mode).

If the user has pressed the button 401, normal playback is executed in step S3006. In this normal playback, all frame data of a low-quality frame group are decoded, and data of a high-quality frame group, which reproduce the same resolution and same image quality as those of the low-quality frame group, are decoded at 30 fps. The display rate remains at 60 fps.

If the user has not pressed the button 401, slow playback is executed in step S3007. This slow playback decodes and displays a low-quality frame group at 15 fps, and decodes a high-quality frame group by lossless decoding and displays decoded frames at 60 fps.

If it is determined in step S3004 that the automatic slow playback mode is selected, it is checked in step S3008 if the user has pressed the button 401. If NO in step S3008, normal playback that automatically plays back a high-quality frame group in the slow playback mode is executed in step S3009. On the other hand, if it is determined in step S3008 that the user has pressed the button 401, slow playback is executed in step S3010. In this slow playback, a low-definition frame group is decoded and displayed at 15 fps, and a high-definition frame group is decoded by lossless decoding and decoded frames are displayed at 60 fps.

<JPEG2000 Decoding Method>

The JPEG2000 decoding method is the same as that in the first embodiment.

<Normal Playback (Step S3006)>

The normal playback process is the same as that in the first embodiment.

<Slow Playback Mode (steps S3007 and S3010)>

The slow playback process is the same as that in the first embodiment.

Automatic Slow Playback (Step S3009)

The implementation method of the automatic slow playback mode (½× speed) will be described in detail below. In this automatic slow playback mode, all data of both high- and low-quality frames are decoded and displayed. The user can browse high-quality frames in the slow playback mode without issuing any instruction.

Initially, (all) encoded data at 60 frames/sec are time-serially transferred from encoded moving image data (captured and recorded at mixed rates) which is read out by the reader 101 in FIG. 1 and is temporarily stored in the memory 102 to the JPEG2000 decoding unit 103 at a transfer rate of 30 frames/sec, and are decoded.

A decoded image obtained by this process is sequentially written in the display memory at a timing of 30 frames/sec. As in the above embodiment, the display unit 105 displays at 60 frames/sec.

In this case, a scene that the user is curious about of a moving image displayed on the display area 400 in FIG. 4 is expressed by high-definition data and is displayed in the slow playback mode. This process is done automatically.

As described above, the moving image playback apparatus of the sixth embodiment has the manual slow playback mode and automatic slow playback mode. When the former mode is selected, high-quality slow playback is made upon reception of a slow playback instruction. On the other hand, when the latter mode is selected, frames at a high frame rate undergo high-quality slow playback irrespective of the presence/absence of a slow playback instruction.

[Modification]

Note that various modifications may be made in the embodiments described above, as long as a method used upon decoding some or all of encoded moving image data, which is encoded at a period of A frames (A is an integer) per sec, and displaying the obtained decoded image at a period of B frames (B is an integer satisfying A≧B) per sec, comprises a holding step of holding the encoded moving image data, a switching step of switching a playback mode between a normal playback mode and slow playback mode, a first decoding step of reading out and sequentially decoding first encoded data obtained by decimating frames, which form the held encoded moving image data, to C/A (C is an integer satisfying A>C) in the normal playback mode, a first display step of reading out display images for B frames per sec on the basis of the decoded images for C frames in the normal playback mode, a second decoding step of reading out and sequentially decoding second encoded data obtained by decimating frames, which form the held encoded moving image data, to D/A (D is an integer satisfying A≧D>C) in the slow playback mode, and a second display step of reading out display images for B frames per sec on the basis of the decoded images for D frames in the slow playback mode.

In the above embodiments, A, B, C, and D have been respectively explained as A=60, B=60, C=30, and D=60. However, the present invention is not limited to such specific values. For example, original encoded moving image data may have a still high frame rate like A=90, B=60, C=30, and D=60, the number of frames per sec of a decoded image in the normal playback mode is reduced like A=60, B=60, C=20, and D=60, the display frame rate may be set to a minimum required value like A=60, B=30, C=30, and D=60, and so forth. In this way, various other combinations of numerical values may be used within the objects and effects of the present invention.

In the above embodiments, only the ½× slow playback speed has been explained. However, the present invention is not limited to such specific value, and can be applied to a case wherein a plurality of slow playback speeds are available.

For example, if ½× and ⅓× slow playback speeds are available in the slow playback mode, and A=90, B=60, C=30, and D=60, normal playback is made by decoding encoded moving image data while decimating frames which form the encoded moving image data to 30/90, ½× slow playback is made by decoding encoded moving image data while decimating frames which form the encoded moving image data to 60/90, and ⅓× slow playback is made by decoding all frames (90 frames) which form encoded moving image data. In this way, a display at substantially 30 frames/sec can be attained in all the playback mode, and a smooth image can be displayed. Also, the load on the decoder can be reduced as much as possible in the normal playback mode and ½× slow playback mode.

Even in this modification, various other modifications may be made, as long as a method used upon decoding some or all of encoded moving image data, which is encoded at a period of A frames (A is an integer) per sec, and displaying the obtained decoded image at a period of B frames (B is an integer satisfying A≧B) per sec, comprises a holding step of holding the encoded moving image data, a switching step of switching a playback mode among a normal playback mode, and first and second slow playback modes, a first decoding step of reading out and sequentially decoding first encoded data obtained by decimating frames, which form the held encoded moving image data, to C/A (C is an integer satisfying A>C) in the normal playback mode, a first display step of reading out display images for B frames per sec on the basis of the decoded images for C frames in the normal playback mode, a second decoding step of reading out and sequentially decoding second encoded data obtained by decimating frames, which form the held encoded moving image data, to D/A (D is an integer satisfying A≧D>C) in the first slow playback mode, a second display step of reading out display images for B frames per sec on the basis of the decoded images for D frames in the first slow playback mode, a third decoding step of reading out and sequentially decoding third encoded data obtained by decimating frames, which form the held encoded moving image data, to E/A (D is an integer satisfying A≧E>D>C) in the second slow playback mode, and a third display step of reading out display images for B frames per sec on the basis of the decoded images for E frames in the second slow playback mode.

Note that the display device has a display frame rate of 60 fps in the description of the above embodiments. However, this frame rate indicates that upon transferring data from a video RAM to the display device, and is independent from the decoding/playback process. In case of an NTSC television, since display is made at 30 fps, a decoded image may be displayed on such display device. That is, the frame rate in the playback process of this embodiment means a rewrite rate of the video RAM, and the transfer rate of data from the video RAM to the display device is not particularly limited.

Note that the present invention may be applied to a part of either a system constituted by a plurality of devices (e.g., a host computer, interface device, reader, printer, and the like), or an apparatus consisting of a single equipment (e.g., a copying machine, facsimile apparatus, or the like).

The present invention is not limited to the apparatus and method for implementing the above embodiments, and the scope of the present invention includes a case wherein the above embodiments are achieved by supplying a program code of software that can implement the above-mentioned embodiments to a computer (CPU or MPU) in the system or apparatus, and making the computer of the system or apparatus control respective devices in accordance with the program code.

In this case, the program code of the software itself implements the functions of the above-mentioned embodiments, and the program code itself and means for supplying the program code to the computer, i.e., a storage medium that stores the program code, are included in the scope of the present invention.

As the storage medium for supplying the program code, for example, a floppy disk, hard disk, optical disk, magneto-optical disk, CD-ROM, DVD, magnetic tape, nonvolatile memory card, ROM, and the like may be used.

Such program code is included in the scope of the present invention not only when the functions of the above embodiments are implemented by making the computer control various devices in accordance with only the supplied program code, but also when the functions of the embodiments are implemented by collaboration of the program code and an OS (operating system) or another application software running on the computer.

Furthermore, the scope of the present invention includes a case wherein the functions of the above embodiments are implemented by some or all of actual processing operations executed by a CPU or the like arranged in a function extension board of the computer or a function extension unit connected to the computer, after the supplied program code is written in a memory of the extension board or unit.

As described above, according to the above embodiments, even when moving image data to be decoded (played back) is recorded (encoded) at a high frame rate, the load on the decoding process of that apparatus (a CPU in case of a computer) can be reduced as much as possible in correspondence with the level of human visual recognition.

As described above, according to the present invention, even when moving image data to be decoded (played back) is recorded (encoded) at a high frame rate, a smooth moving image can be played back in both the normal and slow playback modes in consideration of the human visual recognition level.

According to another invention, the quality of a playback image can be improved in the slow playback mode.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus for, when a frame rate, which can assure sufficiently high image quality of a moving image, is expressed by N frames/sec, playing back moving image data, which has a frame rate of M (M>N) frames/sec higher than that frame rate, and respective frames of which are compression-encoded to be independently decodable, comprising:

decoding means for decoding the compression-encoded frames;

switching means for switching a playback mode between a normal playback mode and slow playback mode;

first playback means for, when said switching means selects the normal playback mode, reading out frames from the image data at a first frame interval, decoding the readout frames by said decoding means, and playing back the decoded frames at substantially N frames/sec; and second playback means for, when said switching means selects the slow playback mode, reading out frames from the image data at a second frame interval narrower than the first frame interval, decoding the readout frames by said decoding means, and playing back the decoded frames at least at substantially N frames/sec.

2. The apparatus according to claim 1, wherein the compressed moving image data has a structure which includes both a frame group captured at M frames/sec, and a frame group captured at N frames/sec, and
said second playback means is applied to the frame group captured at M frames/sec.

3. The apparatus according to claim 1, wherein the compressed moving image data has a structure which includes both a frame group captured at M frames/sec, and a frame group captured at N frames/sec, and
said apparatus further comprises third playback means for playing back the frame group captured at N frames/sec at a normal frame rate, and playing back the frame group captured at M frames/sec in the slow playback mode at the normal frame rate without decimation upon playing back the moving image data.

4. The apparatus according to claim 3, wherein said second playback means includes a manual mode that executes slow playback upon reception of a slow playback instruction, and an auto mode that executes a slow playback process irrespective of the presence/absence of a slow playback instruction.

5. The apparatus according to claim 1, wherein the respective frames of the moving image data are encoded by JPEG2000 encoding.

6. The apparatus according to claim 1, wherein the moving image data is encoded by MotionJPEG encoding.

7. An image processing method of playing back, when a frame rate, which can assure sufficiently high image quality of a moving image, is expressed by N frames/sec, moving image data, which has a frame rate of M (M>N) frames/sec higher than that frame rate, and respective frames of which are compression-encoded to be independently decodable, comprising:
a decoding step of decoding the compression-encoded frames;
a first playback step of reading out, when switching means for switching a playback mode between a normal playback mode and slow playback mode selects the normal playback mode, frames from the image data at a first frame interval, decoding the readout frames in the decoding step, and playing back the decoded frames at substantially N frames/sec; and
a second playback step of reading out, when the switching means selects the slow playback mode, frames from the image data at a second frame interval narrower than the first frame interval, decoding the readout frames in the decoding step, and playing back the decoded frames at least at substantially N frames/sec.

8. A computer-readable medium storing a computer program for causing a computer to serve as an image processing apparatus for, when a frame rate, which can assure sufficiently high image quality of a moving image, is expressed by N frames/sec, playing back moving image data, which has a frame rate of M (M>N) frames/sec higher than that frame rate, and respective frames of which are compression-encoded to be independently decodable, said program serving as:
decoding means for decoding the compression-encoded frames;
first playback means for, when switching means for switching a playback mode between a normal playback mode and slow playback mode selects the normal playback mode, reading out frames from the image data at a first frame interval, decoding the readout frames by said decoding means, and playing back the decoded frames at substantially N frames/sec; and
second playback means for, when said switching means selects the slow playback mode, reading out frames from the image data at a second frame interval narrower than the first frame interval, decoding the readout frames by said decoding means, and playing back the decoded frames at least at substantially N frames/sec.

9. An image processing apparatus for playing back moving image data, respective frames of which are hierarchically compression-encoded to be independently decodable, comprising:
decoding means for decoding the compression-encoded frames;
switching means for switching a playback mode between a normal playback mode and slow playback mode;
first playback means for, when said switching means selects the normal playback mode, reading out data within a first range from low to high hierarchical components of respective frames from the moving image data, decoding the readout frames by said decoding means, and playing back the decoded frames; and
second playback means for, when said switching means selects the slow playback mode, reading out data within a second range, broader than the first range, from low to high hierarchical components of respective frames from the moving image data, decoding the readout frames by said decoding means, and playing back the decoded frames,
wherein a high-definition frame group in the moving image data is moving image data which, when a frame rate that can assure sufficiently high image quality of a moving image is expressed by N frames/sec, has a frame rate of M (M>N) frames/sec higher than that frame rate, and respective frames of which are compression-encoded to be independently decodable,
wherein said first playback means reads out respective frames from the image data at a first frame interval, decodes the readout frames by said decoding means, and plays back the decoded frames at substantially N frames/sec, and
wherein said second playback means reads out respective frames from the image data at a second frame interval narrower than the first frame interval, decodes the readout frames by said decoding means, and plays back the decoded frames at least at substantially N frames/sec.

10. The apparatus according to claim 9, wherein the compression-encoded moving image data is a data stream which includes both a high-definition frame group, and a low-definition frame group, and said second playback means is applied to only the high-definition frame group.

11. The apparatus according to claim 9, wherein the compression-encoded moving image data is a data stream which includes both a high-definition frame group, and a low-definition frame group, and
said apparatus further comprises control means for, when the high-definition frame group is played back, controlling to play back using said second playback means.

12. The apparatus according to claim 9, wherein said second playback means includes a manual mode that executes slow playback upon reception of a slow playback instruction, and an auto mode that executes a slow playback process irrespective of the presence/absence of a slow playback instruction.

13. The apparatus according to claim 9, wherein the respective frames of the moving image data are encoded by JPEG2000 encoding.

14. The apparatus according to claim 9, wherein the moving image data is encoded by MotionJPEG encoding.

15. The apparatus according to claim 9, wherein the compressed moving image data has a structure which includes both a frame group captured at M frames/sec, and a frame group captured at N frames/sec, and said second playback means is applied to the frame group captured at M frames/sec.

16. The apparatus according to claim 9, wherein the compressed moving image data has a structure which includes both a frame group captured at M frames/sec, and a frame group captured at N frames/sec, and said apparatus further comprises third playback means for playing back the frame group captured at N frames/sec at a normal frame rate, and playing back the frame group captured at M frames/sec in the slow playback mode at the normal frame rate without decimation upon playing back the moving image data.

17. The apparatus according to claim 9, wherein said second playback means includes a manual mode that executes slow playback upon reception of a slow playback instruction, and an auto mode that executes a slow playback process irrespective of the presence/absence of a slow playback instruction.

18. An image processing method of playing back moving image data, respective frames of which are compression-encoded for respective subbands of hierarchical frequency components to be independently decodable, comprising:

a decoding step of decoding the compression-encoded frames;

a first playback step of reading out, when switching means for switching a playback mode between a normal playback mode and slow playback mode selects the normal playback mode, data within a first range from low to high hierarchical components of respective frames from the moving image data, decoding the readout frames in the decoding step, and playing back the decoded frames; and a second playback step of, when said switching means selects the slow playback mode, reading out data within a second range, broader than the first range, from low to high hierarchical components of respective frames from the moving image data, decoding the readout frames in the decoding step, and playing back the decoded frames, wherein a high-definition frame group in the moving image data is moving image data which, when a frame rate that can assure sufficiently high image quality of a moving image is expressed by N frames/sec, has a frames rate of M (M>N) frame/sec higher than that frame rate, and respective frames of which are compression-encoded to be independently decodable, wherein said first playback step includes reading out respective frames from the image data at a first frame interval, decoding the readout frames by means of said decoding step, and playing back the decoded frames at substantially N frames/sec, and wherein said second playback step includes reading out respective frames from the image data at a second frame interval narrower than the first frame interval, decoding the readout frames by means of said decoding step, and playing back the decoded frames at least at substantially N frames/sec.

19. A computer-readable medium storing a computer program for causing a computer to serve as an image processing apparatus for playing back moving image data, respective frames of which are hierarchically compression-encoded to be independently decodable, said program serving as:

decoding means for decoding the compression-encoded frames;

first playback means for, when switching means for switching a playback mode between a normal playback mode and slow playback mode selects the normal playback mode, reading out data within a first range from low to high hierarchical components of respective frames from the moving image data, decoding the readout frames by said decoding means, and playing back the decoded frames; and second playback means for, when said switching means selects the slow playback mode, reading out data within a second range, broader than the first range, from low to high hierarchical components of respective frames from the moving image data, decoding the readout frames by said decoding means, and playing back the decoded frames, wherein a high-definition frame group in the moving image data is moving image data which, when a frame rate that can assure sufficiently high image quality of a moving image is expressed by N frames/sec, has a frame rate of M (M>N) frames/sec higher than that frame rate, and respective frames of which are compression-encoded to be independently decodable, wherein said first playback step includes reading out respective frames from the image data at a first frame interval, decoding the readout frames by means of said decoding step, and playing back the decoded frames at substantially N frames/sec, and wherein said second playback step includes reading out respective frames from the image data at a second frame interval narrower than the first frame interval, decoding the readout frames by means of said decoding step, and playing back the decoded frames at least at substantially N frames/sec.

* * * * *